(12) United States Patent
Kimura

(10) Patent No.: US 10,488,192 B2
(45) Date of Patent: Nov. 26, 2019

(54) DISTANCE SENSOR PROJECTING PARALLEL PATTERNS

(71) Applicant: Magik Eye Inc., New York, NY (US)

(72) Inventor: Akiteru Kimura, Tokyo (JP)

(73) Assignee: MAGIK EYE INC., New York, NY (US)

( * ) Notice: Subject to any disclaimer, the term of this patent is extended or adjusted under 35 U.S.C. 154(b) by 0 days.

(21) Appl. No.: 15/832,066

(22) Filed: Dec. 5, 2017

(65) Prior Publication Data

US 2018/0143018 A1 May 24, 2018

Related U.S. Application Data

(63) Continuation-in-part of application No. 15/149,323, filed on May 9, 2016.

(Continued)

(51) Int. Cl.

| | |
|---|---|
| *G01N 21/64* | (2006.01) |
| *A61B 18/20* | (2006.01) |
| *A61B 1/05* | (2006.01) |
| *A61B 1/06* | (2006.01) |
| *G01B 11/14* | (2006.01) |
| *G06T 7/00* | (2017.01) |
| *H04N 7/18* | (2006.01) |
| *G01C 3/08* | (2006.01) |

(Continued)

(52) U.S. Cl.
CPC ............. *G01C 3/08* (2013.01); *G01B 11/026* (2013.01); *G01B 11/2513* (2013.01); *G01B 11/2545* (2013.01); *G06T 7/521* (2017.01); *H04N 5/2226* (2013.01); *H04N 5/2256* (2013.01); *G06T 2207/10004* (2013.01); *G06T 2207/30252* (2013.01); *H04N 13/254* (2018.05)

(58) Field of Classification Search
CPC ........... G06T 2207/10028; F21V 5/008; G01B 11/026; G02B 27/425; H04N 9/3161
See application file for complete search history.

(56) References Cited

U.S. PATENT DOCUMENTS

| | | |
|---|---|---|
| 4,914,460 A | 4/1990 | Caimi et al. |
| 5,598,299 A | 1/1997 | Hayakawa |

(Continued)

FOREIGN PATENT DOCUMENTS

| | | |
|---|---|---|
| CN | 101794065 A | 8/2010 |
| CN | 103559735 A | 2/2014 |

(Continued)

OTHER PUBLICATIONS

International Search Report and Written Opinion of corresponding PCT/US2017/064680, dated Mar. 22, 2018, 15 pages.

*Primary Examiner* — Alison Slater
(74) *Attorney, Agent, or Firm* — Tong, Rea, Bentley & Kim, LLC

(57) ABSTRACT

In one embodiment, a method for calculating a distance to an object includes projecting a plurality of beams simultaneously from a light source, wherein the plurality of beams causes a plurality of lines of dots to be projected onto the object, and wherein the plurality of lines of dots are orientated parallel to each other, capturing an image of a field of view, wherein the object is visible in the image and the plurality of lines of dots is also visible in the image, and calculating the distance to the object using information in the image.

21 Claims, 20 Drawing Sheets

Related U.S. Application Data

(60) Provisional application No. 62/430,998, filed on Dec. 7, 2016, provisional application No. 62/159,286, filed on May 10, 2015.

(51) Int. Cl.

| | | |
|---|---|---|
| *G06T 7/521* | (2017.01) | |
| *H04N 5/225* | (2006.01) | |
| *H04N 5/222* | (2006.01) | |
| *G01B 11/02* | (2006.01) | |
| *G01B 11/25* | (2006.01) | |
| *H04N 13/254* | (2018.01) | |

(56) References Cited

U.S. PATENT DOCUMENTS

| | | | |
|---|---|---|---|
| 5,730,702 A | 3/1998 | Tanaka et al. | |
| 5,980,454 A | 11/1999 | Broome | |
| 9,686,539 B1 | 6/2017 | Zuliani et al. | |
| 2003/0071891 A1 | 4/2003 | Geng | |
| 2006/0055942 A1 | 3/2006 | Krattiger | |
| 2006/0290781 A1* | 12/2006 | Hama | G01C 3/08 348/135 |
| 2007/0091174 A1 | 4/2007 | Kochi et al. | |
| 2007/0165243 A1 | 7/2007 | Kang et al. | |
| 2007/0206099 A1 | 9/2007 | Matsuo | |
| 2008/0128506 A1 | 6/2008 | Tsikos | |
| 2010/0149315 A1 | 6/2010 | Qu et al. | |
| 2010/0238416 A1 | 9/2010 | Kuwata | |
| 2011/0188054 A1 | 8/2011 | Petronius et al. | |
| 2012/0051588 A1 | 3/2012 | Mceldowney | |
| 2012/0056982 A1 | 3/2012 | Katz et al. | |
| 2012/0113252 A1 | 5/2012 | Yang et al. | |
| 2012/0219699 A1 | 8/2012 | Pettersson | |
| 2012/0225718 A1 | 9/2012 | Zhang | |
| 2012/0236288 A1 | 9/2012 | Stanley | |
| 2012/0236317 A1 | 9/2012 | Nomura | |
| 2013/0155417 A1 | 6/2013 | Ohsawa | |
| 2013/0242090 A1 | 9/2013 | Yoshikawa | |
| 2014/0000520 A1* | 1/2014 | Bareket | A01J 5/0175 119/14.02 |
| 2014/0009571 A1 | 1/2014 | Geng | |
| 2014/0016113 A1 | 1/2014 | Holt et al. | |
| 2014/0036096 A1* | 2/2014 | Sterngren | H04N 17/002 348/188 |
| 2014/0071239 A1 | 3/2014 | Yokota | |
| 2014/0085429 A1 | 3/2014 | Hérbert | |
| 2014/0125813 A1* | 5/2014 | Holz | G06K 9/00375 348/169 |
| 2014/0207326 A1 | 7/2014 | Murphy | |
| 2014/0241614 A1 | 8/2014 | Lee | |
| 2014/0275986 A1 | 9/2014 | Vertikov | |
| 2014/0320605 A1 | 10/2014 | Johnson | |
| 2015/0009301 A1 | 1/2015 | Ribnick et al. | |
| 2015/0077764 A1 | 3/2015 | Braker | |
| 2015/0160003 A1 | 6/2015 | Terry et al. | |
| 2015/0171236 A1 | 6/2015 | Murray | |
| 2015/0248796 A1 | 9/2015 | Iyer et al. | |
| 2015/0268399 A1* | 9/2015 | Futterer | G02B 6/005 315/151 |
| 2015/0288956 A1 | 10/2015 | Mallet et al. | |
| 2015/0323321 A1 | 11/2015 | Oumi | |
| 2016/0022374 A1* | 1/2016 | Haider | A61B 17/17 606/96 |
| 2016/0117561 A1 | 4/2016 | Miyazawa et al. | |
| 2016/0128553 A1* | 5/2016 | Geng | A61B 5/0064 600/111 |
| 2016/0178915 A1 | 6/2016 | Mor et al. | |
| 2016/0267682 A1 | 9/2016 | Yamashita | |
| 2016/0327385 A1 | 11/2016 | Kimura | |
| 2016/0328854 A1 | 11/2016 | Kimura | |
| 2016/0334939 A1 | 11/2016 | Dawson et al. | |
| 2016/0350594 A1 | 12/2016 | McDonald | |
| 2017/0098305 A1 | 4/2017 | Gossow | |
| 2017/0221226 A1 | 8/2017 | Shen et al. | |
| 2017/0284799 A1 | 10/2017 | Wexler et al. | |
| 2017/0307544 A1* | 10/2017 | Nagata | H01L 31/02325 250/208.1 |
| 2018/0010903 A1 | 1/2018 | Takao et al. | |
| 2018/0011194 A1 | 1/2018 | Masuda et al. | |
| 2018/0143018 A1 | 5/2018 | Kimura | |

FOREIGN PATENT DOCUMENTS

| | | |
|---|---|---|
| JP | 2007-315864 A | 12/2007 |
| JP | 2010-101683 A | 5/2010 |
| JP | 2014-511590 A | 5/2014 |
| JP | 2014-122789 A | 7/2014 |
| JP | 6038415 B1 | 12/2016 |
| KR | 10-2015-0101749 A | 9/2015 |
| WO | WO 2014/0106843 A2 | 7/2014 |
| WO | WO 2014/131064 | 8/2014 |

* cited by examiner

DISTANCE SENSOR PROJECTING PARALLEL PATTERNS

CROSS REFERENCE TO RELATED APPLICATIONS

This application is a continuation-in-part of U.S. patent application Ser. No. 15/149,323, filed May 9, 2016, which in turn claims the benefit of U.S. Provisional Patent Application Ser. No. 62/159,286, filed May 10, 2015. This application also claims the benefit of U.S. Provisional Patent Application Ser. No. 62/430,998, filed Dec. 7, 2016. All of these applications are herein incorporated by reference in their entireties.

BACKGROUND OF THE DISCLOSURE

The present disclosure relates generally computer vision systems and relates more particularly to sensors for measuring the distance to an object or point in space.

Unmanned vehicles, such as robotic vehicles and drones, typically rely on computer vision systems for obstacle detection and navigation in the surrounding environment. These computer vision systems, in turn, typically rely on various sensors that acquire visual data from the surrounding environment, which the computer vision systems process in order to gather information about the surrounding environment. For instance, data acquired via one or more imaging sensors may be used to determine the distance from the vehicle to a particular object or point in the surrounding environment.

SUMMARY

In one embodiment, a method for calculating a distance to an object includes projecting a plurality of beams simultaneously from a light source, wherein the plurality of beams causes a plurality of lines of dots to be projected onto the object, and wherein the plurality of lines of dots are orientated parallel to each other, capturing an image of a field of view, wherein the object is visible in the image and the plurality of lines of dots is also visible in the image, and calculating the distance to the object using information in the image.

In another embodiment, a computer-readable storage device stores a plurality of instructions which, when executed by a processor, cause the processor to perform operations for calculating a distance to an object. The operations include projecting a plurality of beams simultaneously from a light source, wherein the plurality of beams causes a plurality of lines of dots to be projected onto the object, and wherein the plurality of lines of dots are orientated parallel to each other, capturing an image of a field of view, wherein the object is visible in the image and the plurality of lines of dots is also visible in the image, and calculating the distance to the object using information in the image.

In another example, an apparatus includes a light source to project a plurality of beams simultaneously, wherein the plurality of beams causes a plurality of lines of dots to be projected onto an object, and wherein the plurality of lines of dots are orientated parallel to each other, an imaging sensor to capture an image of a field of view, wherein the object is visible in the image and the plurality of lines of dots is also visible in the image, and circuitry to calculate the distance to the object using information in the image.

BRIEF DESCRIPTION OF THE DRAWINGS

The teaching of the present disclosure can be readily understood by considering the following detailed description in conjunction with the accompanying drawings, in which.

To facilitate understanding, identical reference numerals have been used, where possible, to designate identical elements that are common to the figures.

DETAILED DESCRIPTION

In one embodiment, the present disclosure relates to a distance sensor. Distance sensors may be used in unmanned vehicles in order to help a computer vision system determine the distance from the vehicle to a particular object or point in the surrounding environment. For instance, a distance sensor may project one or more beams of light onto the object or point and then compute the distance according to time of flight (TOF), analysis of the reflected light (e.g., lidar), or other means. Conventional distance sensors of this type tend to be bulky, however, and thus may not be suitable for use in compact vehicles. Moreover, the sensors can be very expensive to manufacture and tend to have a limited field of view. For instance, even using an arrangement of multiple conventional imaging sensors provides a field of view that is less than 360 degrees. Distance sensors of the type disclosed may also be used for other applications, including three-dimensional (3D) imaging.

Examples of the disclosure provide optical configuration refinements for a compact distance sensor, such as any of the distance sensors disclosed in U.S. patent application Ser. No. 14/920,246, filed Oct. 22, 2015. One or more light sources project a plurality of beams that collectively form a pattern of lines when incident upon an object. One or more imaging sensors then capture two-dimensional images of the object and the pattern, and, based on the appearance of the pattern on the object in the images, calculate a distance to the object. Within the context of the present disclosure, a "beam" or "projection beam" refers to a form of light that is emitted by a light source of the disclosed distance sensor. A "line" or "pattern" refers to an image that is created on a surface or object when a beam emitted by a light source is incident upon that surface or object.

Figure 1A:
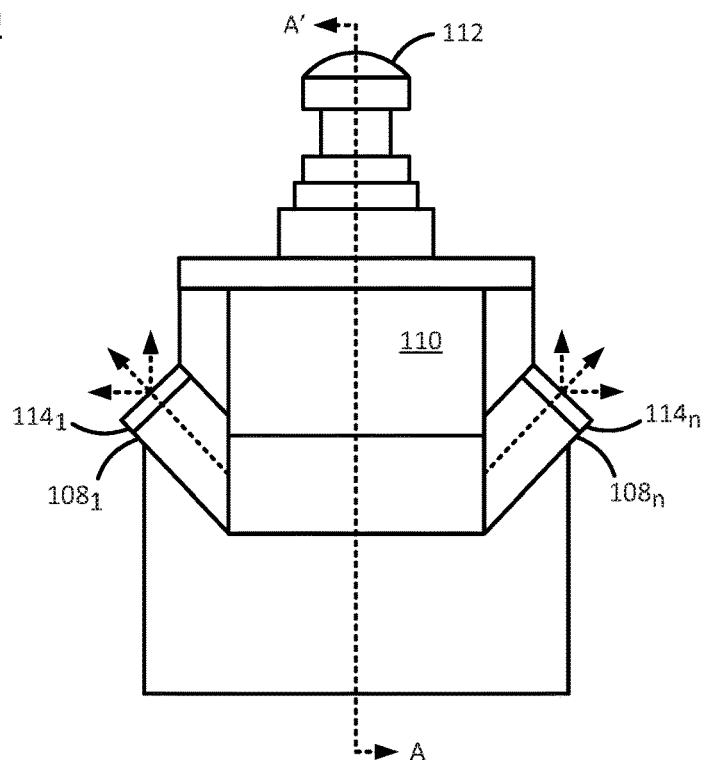
FIG. 1A illustrates a cross-sectional view of one embodiment of a distance sensor that may be used to generate optical configurations of the present disclosure.
Figure 1B:
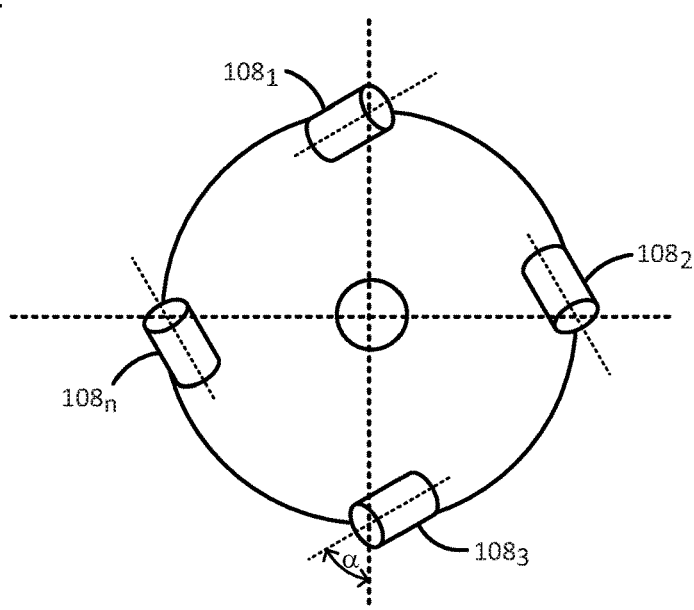
FIG. 1B illustrates a top view of the distance sensor of FIG. 1A.

For instance, FIGS. 1A and 1B illustrate one example of a distance sensor 100 that may be used to generate optical configurations of the present disclosure. In particular, FIG. 1A illustrates a cross-sectional view of the distance sensor 100, while FIG. 1B illustrates a top view of the distance sensor 100 of FIG. 1A. The distance sensor 100 may be mounted, for example, to an unmanned vehicle.

As illustrated in FIG. 1A, the distance sensor 100 comprises a plurality of components arranged within a compact housing 102. In one example, the components include a plurality of light sources $108_1$-$108_n$ (hereinafter collectively referred to as "light sources 108" or individually referred to as a "light source 108") arranged around an imaging sensor 110 that includes a wide-angle lens 112. In one example, the plurality of light sources 108 comprises an even number of light sources. For instance, in the example depicted in FIG. 1A, the plurality of light sources 108 comprises four light sources 108. In one example, the components are arranged substantially symmetrically about a central axis A-A'. For instance, in one example, the central axis A-A' coincides with the optical axis of the imaging sensor 110, and the light sources 108 are spaced at regular intervals (e.g., every thirty degrees, every ninety degrees, or the like) in a ring around the imaging sensor 110, as illustrated in FIG. 1B. However, in other examples, only a single light source 108 may be used.

In one example, each of the light sources 108 is a laser light source that emits a plurality of beams of light, where the plurality of beams of light may project a plurality of lines of dots (or other markings, such as x's, dashes, or the like) onto a surface upon which the plurality of beams is incident. Accordingly, each light source 108 may be considered a projection point for the distance sensor 100, i.e., a point on the distance sensor 100 from which a plurality of beams of light is projected into the field of view. To this end, each projection point may include a respective diffractive optical element $114_1$-$114_n$ (hereinafter collectively referred to as diffractive optical elements 114" or referred to individually as a "diffractive optical element 114") that splits a single beam of light, emitted by the light source 108, into a plurality of beams of light. Each individual beam of the plurality of beams may in turn project a dot or point onto a surface, where the plurality of beams is arranged so that the corresponding dots collectively form a series of parallel lines. The lines may be formed of dots, so that they collectively form a rectangular matrix of dots. Alternatively, the lines may be continuous, or formed of dashes, x's or the like.

The direction of projection of each light source 108 may be fixed relative to the imaging sensor 110. In one example, each light source 108 is configured to project a plurality of beams that forms a different visual pattern on a surface. For example, light source $108_1$ may project a pattern of dots, while light source $108_2$ may project a pattern of dashes or x's, and so on. In a further example, at least one light source 108 of the plurality of light sources 108 is configurable to vary the pattern it projects. In addition, the intensity of the light projected by one or more of the light sources 108 may vary. For example, light source $108_1$ may project light of a first intensity, while light source $108_2$ may project light of a different second intensity, and so on. Alternatively, each light source 108 may be capable of projecting light whose intensity can be varied within some range.

The light that is emitted from each light source 108 is of a wavelength that is known to be relatively safe to human vision (e.g., infrared). In a further example, each light source 108 may include circuitry to adjust the intensity of its output. In a further example, each light source 108 may emit light in pulses, so as to mitigate the effects of ambient light on image capture.

In one example, the plurality of light sources 108 is positioned "behind" a principal point of the imaging sensor 110 (i.e., the point where the optical axis A-A' intersects the image plane), relative to the direction in which light emitted by the plurality of light sources 108 propagates, as shown in FIG. 1A. In one example, at least one light source 108 of the plurality of light sources 108 is detachable from the distance sensor 100.

As discussed above, the imaging sensor 110 may be positioned along the central axis A-A', in the middle of the plurality of light sources 108. In one example, the imaging sensor 110 is an image capturing device, such as a still or video camera. In one particular example, the image capturing device includes a red, green, blue infrared (RGB-IR) sensor. As also discussed above, the imaging sensor 110 includes a wide-angle lens 112, such as a fisheye lens, that creates a hemispherical field of view. In one example, the lens 112 comprises any type of lens other than a center projection or free form surface optical lens. In one example, the imaging sensor 110 includes circuitry for calculating the distance from the distance sensor 100 to an object or point. In another example, the imaging sensor includes a network interface for communicating captured images over a network to a processor, where the processor calculates the distance from the distance sensor 100 to an object or point and then communicates the calculated distance back to the distance sensor 100.

In another example, the distance sensor 100 may employ a single light source 108 that employs a diffractive optical element to split its beam into a first plurality of beams. Each of the first plurality of beams is then further split into a second plurality of beams that is emitted from each projection point of the distance sensor 100 as discussed above (e.g., by the diffractive optical elements 114). This example is discussed in further detail in U.S. patent application Ser. No. 14/920,246.

Thus, in one example, the distance sensor 100 uses a plurality of light sources or projection points to produce a plurality of projection beams, where the plurality of lines produced by the plurality of projection beams (e.g., which may comprise patterns of dots or dashes) may be orientated parallel to each other on a surface onto which they are projected. Thus, a pattern projected by the distance sensor 100 onto a surface may comprise a plurality of parallel lines, where each of the lines comprises a line of dots, dashes, x's, or the like. The distance from the distance sensor 100 to an object can then be calculated from the appearances of the plurality of parallel lines (e.g., by the positions of the dots) in the field of view (e.g., as described in U.S. patent application Ser. No. 14/920,246, filed Oct. 22, 2015). For instance, distance to the object can be detected through the lateral movement of the dots forming the parallel lines, because the lines are always continuously linear even if the distance changes. The size and dimensions of the object can also be directly calculated.

When each of the light sources 108 projects a plurality of lines of a different pattern (e.g., dots, x, dashes, etc.), the circuitry in the imaging sensor 110 can easily determine which lines in a captured image were created by which of the light sources 108. This may facilitate the distance calculations, as discussed in greater detail below. In one example, a different distance calculation technique may be used in conjunction with the patterns projected by each of the light sources 108.

Figure 1C:
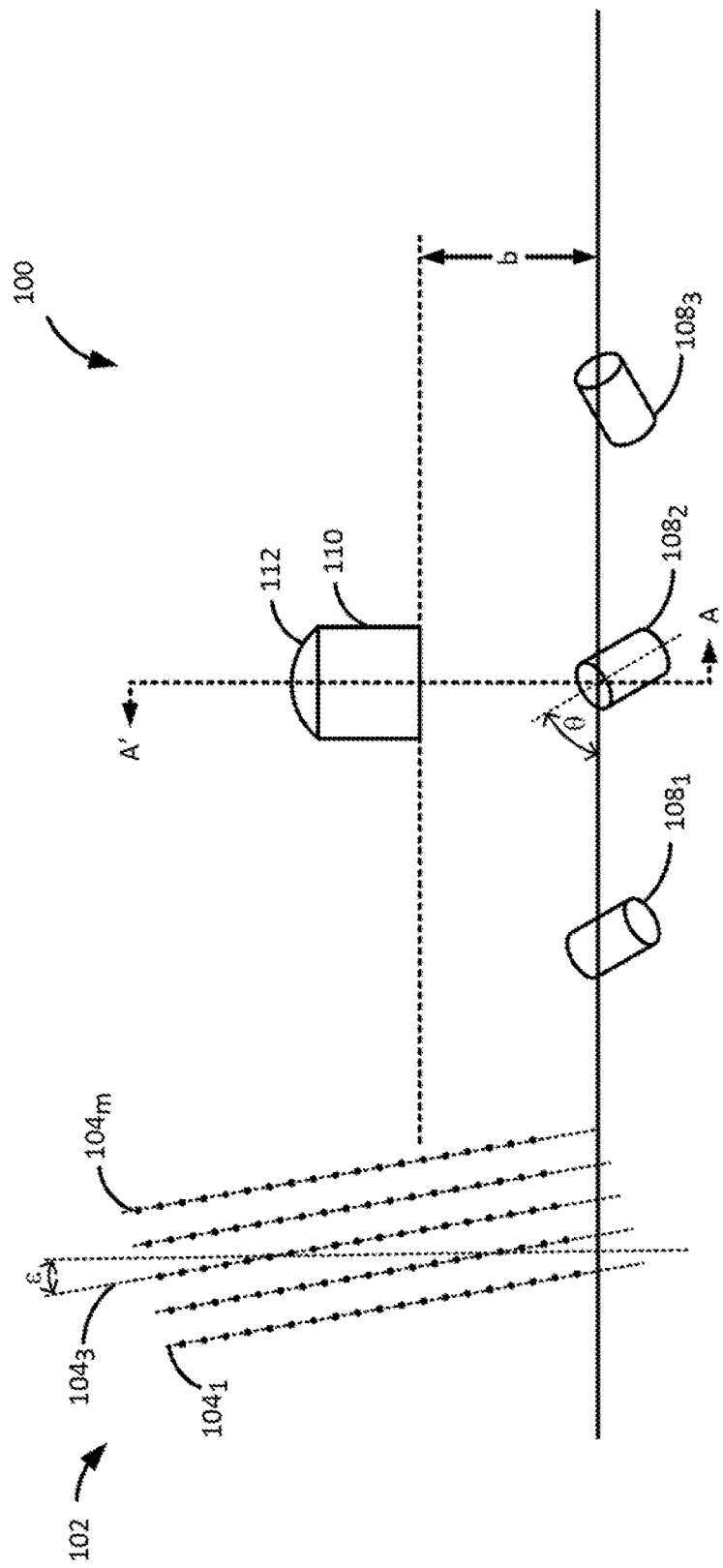
FIG. 1C illustrates a first example of a pattern that may be projected by one of the light sources of the distance sensor of FIGS. 1A and 1B.

As discussed above, the distance sensor 100 may be configured to produce projection beams that form parallel patterns in a field of view. FIG. 1C, for instance, illustrates a first example of a pattern 102 that may be projected by one of the light sources $108_1$ of the distance sensor 100 of FIGS. 1A and 1B. FIG. 1C also illustrates some of the components of the distance sensor 100 of FIGS. 1A and 1B in an exploded view, including the imaging sensor 110, lens 112, and three of the light sources $108_1$, $108_2$, and $108_3$.

As illustrated, the pattern 102 comprises a plurality of parallel lines $104_1$-$104_m$ (hereinafter collectively referred to as "lines 104" or individually referred to as a "line 104"), where each line 104 further comprises a series of dots. The plurality of parallel lines 104 does not overlap or intersect. Collectively, the plurality of lines 104 may form a symmetrical pattern about a center line (i.e., line $104_3$ of FIG. 1C), where the distribution of dots is highly uniform within the field of view (with minimal blind spots, i.e., regions in which the pattern 102 is not projected).

In one example, each line 104 in the plurality of lines 104 is tilted or inclined with respect to a line that is normal to a plane of the light sources 108 by a rotation angle ε to counter a winding direction against the angle α, where the angle α is defined from a top view of the imaging sensor's optical axis direction (i.e., view from an object in the field of view) and the rotation angle ε is defined from the view of the projection direction (i.e., around the projection axis, view from projection point to an object in the field of view). In one example, the angle α is at least thirty degrees, and the angle ε is greater than zero degrees. In FIG. 1B, the winding direction of the rotation angle α is clockwise, while the winding direction of the angle ε is counter clockwise. The angle α may be the same for each light source 108, or two or more of the light sources may have different angles α.

Each light source 108 may be tilted or inclined by an angle θ with respect to the plane of the light sources 108, which creates a fan angle over which a plurality of lines 104 projected by the light source 108 is spread. Moreover, each light source 108 is associated with a shift value b that defines a distance from the light source 108 to the imaging sensor 110, as measured along the optical axis A-A' of the imaging sensor 110.

By projecting a pattern 102 of parallel, non-overlapping lines 104 of dots, the distance sensor 100 is able to calculate a distance in three dimensions to an object in the imaging sensor's field of view, as discussed in further detail below. The distance may be measured even if the object is moving, reflective, or curved in shape. This distance may even be measured if the lens 112 of the imaging sensor 110 is not a wide angle lens, although the use of a wide angle lens such as a fisheye lens allows the distance sensor 100 to cover a wider (e.g., hemispherical) field of view.

Figure 2A:
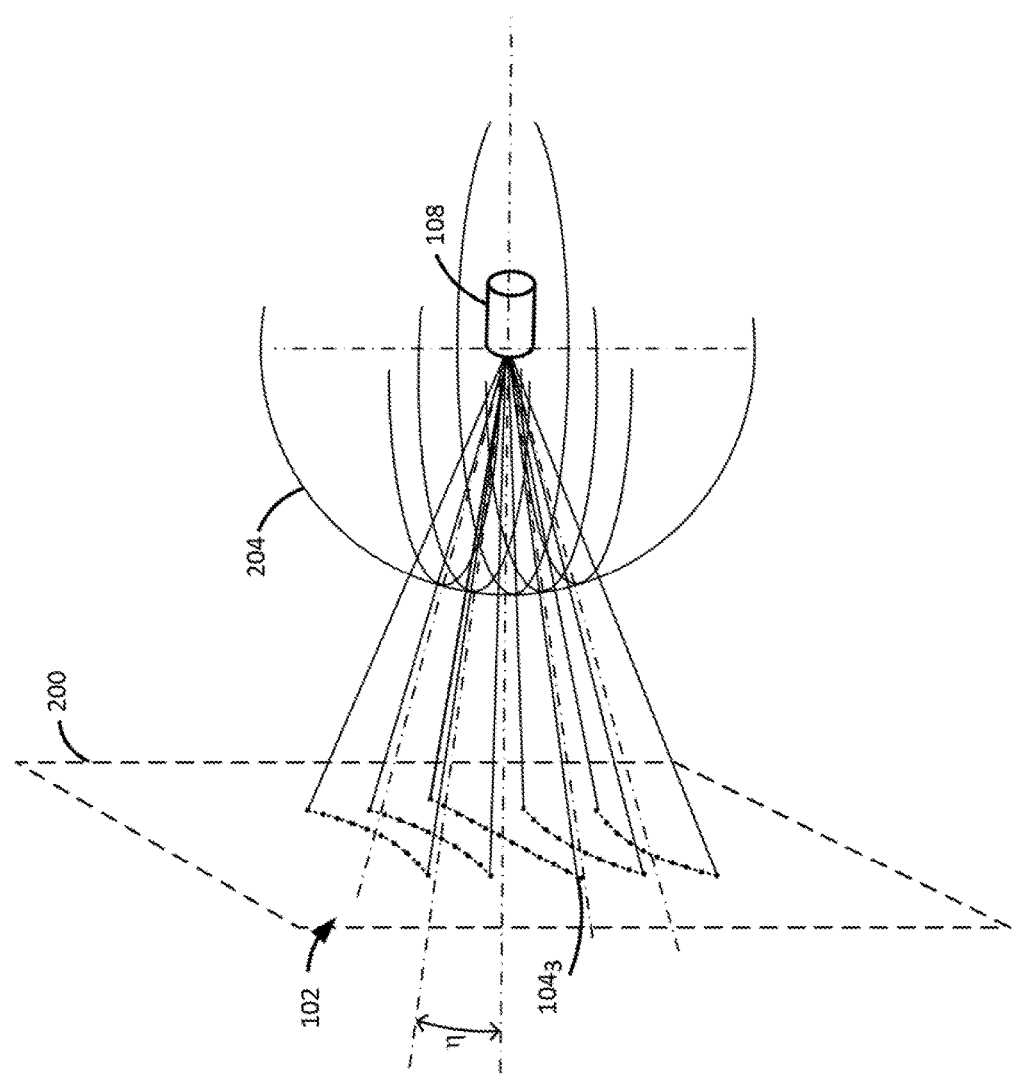
FIG. 2A illustrates the example pattern of parallel lines illustrated in FIG. 1C, projected onto a surface.
Figure 2C:
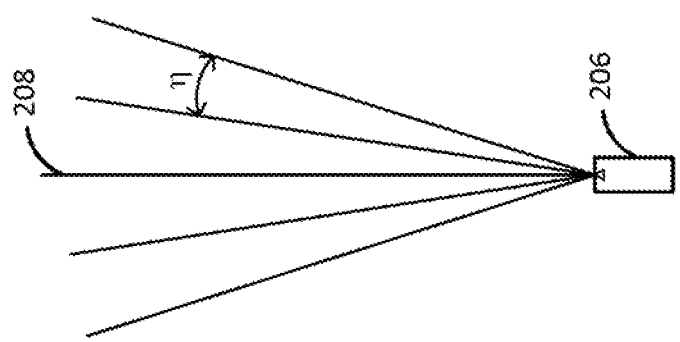
FIG. 2C illustrates a side view of the fan of beams of FIG. 2B.
Figure 2B:
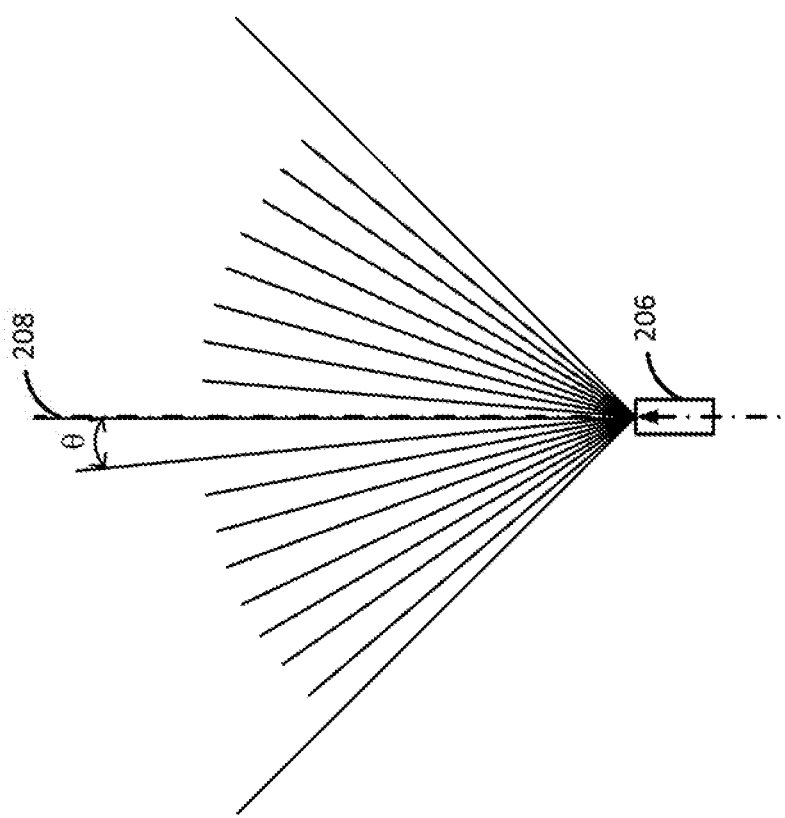
FIG. 2B illustrates a front view of the "fan" of beams projected by the light source of FIG. 2A.

FIG. 2A, for instance, illustrates another view of the example pattern 102 of parallel lines illustrated in FIG. 1C, projected onto a surface 200. As illustrated, the pattern 102 is substantially symmetrical about a center line $104_3$. As also illustrated, the field of view 204 of the distance sensor is substantially hemispherical. FIG. 2A also illustrates how a plurality of beams projected from one light source 108 may spread out in a fan arrangement from the light source 108 to create the pattern 102 of parallel, non-overlapping lines on the surface 200. FIG. 2B illustrates a front view of the "fan" of beams projected by the light source 108 of FIG. 2A, while FIG. 2C illustrates a side view of the fan of beams of FIG. 2B. In the example shown, the spacing between each beam that is projected by the light source 108 is designated by θ, while the spacing between each line in the pattern 102 is designated by η. In one example, the spacing between beams, as well as the spacing between lines, is uniform.

Figure 3:
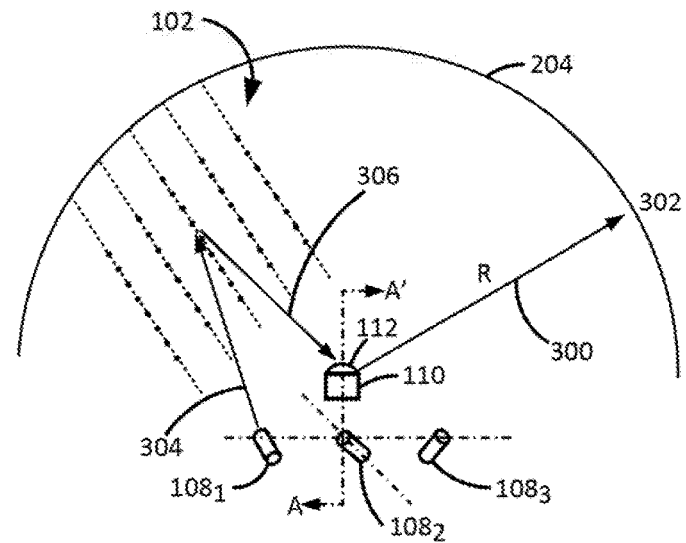
FIG. 3 illustrates another side view of the example pattern of parallel lines illustrated in FIG. 1C, projected into a hemispherical field of view.

FIG. 3 illustrates another side view of the example pattern 102 of parallel lines illustrated in FIG. 1C, projected into a hemispherical field of view 204. Arrow 300 indicates the distance, R, to an object 302 in the field of view 204. Moreover, the arrows 304 and 306 indicate the positional relation between the angle of the beam that is emitted from a light source $108_1$ and the angle at which an image of the pattern projected by the beam is captured by the imaging sensor 110.

Figure 4:
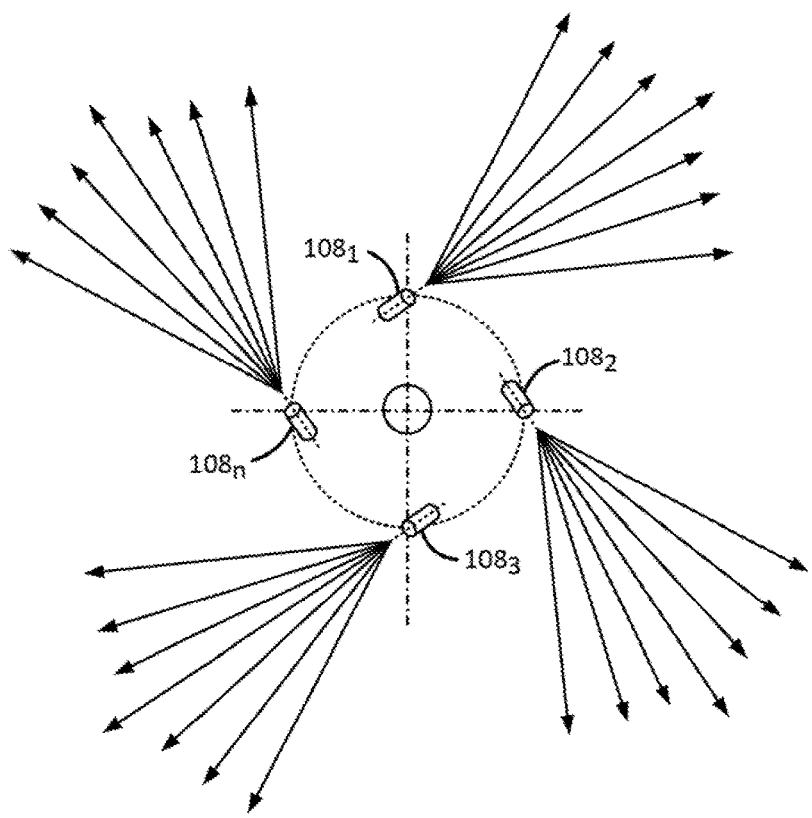
FIG. 4 illustrates a top view of the distance sensor of FIGS. 1A-1C, in which each of the light sources is shown to emit a plurality of beams of light in a fan shape.

FIG. 4 illustrates a top view of the distance sensor 100 of FIGS. 1A-1C, in which each of the light sources 108 is shown to emit a plurality of beams of light in a fan shape. Each plurality of beams creates a respective pattern of parallel lines such as the pattern 102 illustrated in FIGS. 1C and 2A.

Furthermore, in one example, each of the light sources is positioned to emit its plurality of beams at the same angle α relative to a line that connects the projection point of the light source to the optical axis A-A' of the imaging sensor 110. As discussed above, in one example, the angle α is at least thirty degrees. The smaller the angle α, the less spread out the collective pattern that is projected into the field of view will be (i.e., the dots of the projected parallel lines will appear closer together when incident upon a surface). In other words, the dot movement relative to object distance may be too small to allow distance to be determined effectively, particularly for longer distances. The larger the angle α, the more spread out the collective pattern that is projected into the field of view will be (i.e., the dots of the projected parallel lines will appear further apart when incident upon a surface).

When each of the light sources emits a plurality of beams at the same time, the field of view can be uniformly covered in a pattern of parallel lines, where each of the parallel lines is formed by a series of dots, dashes, x's, or the like. In this case, the respective parallel lines formed by the different pluralities of beams do not overlap. This allows the distance sensor 100 to calculate the distance to any object that is present within the hemispherical field of view.

Figure 5A:
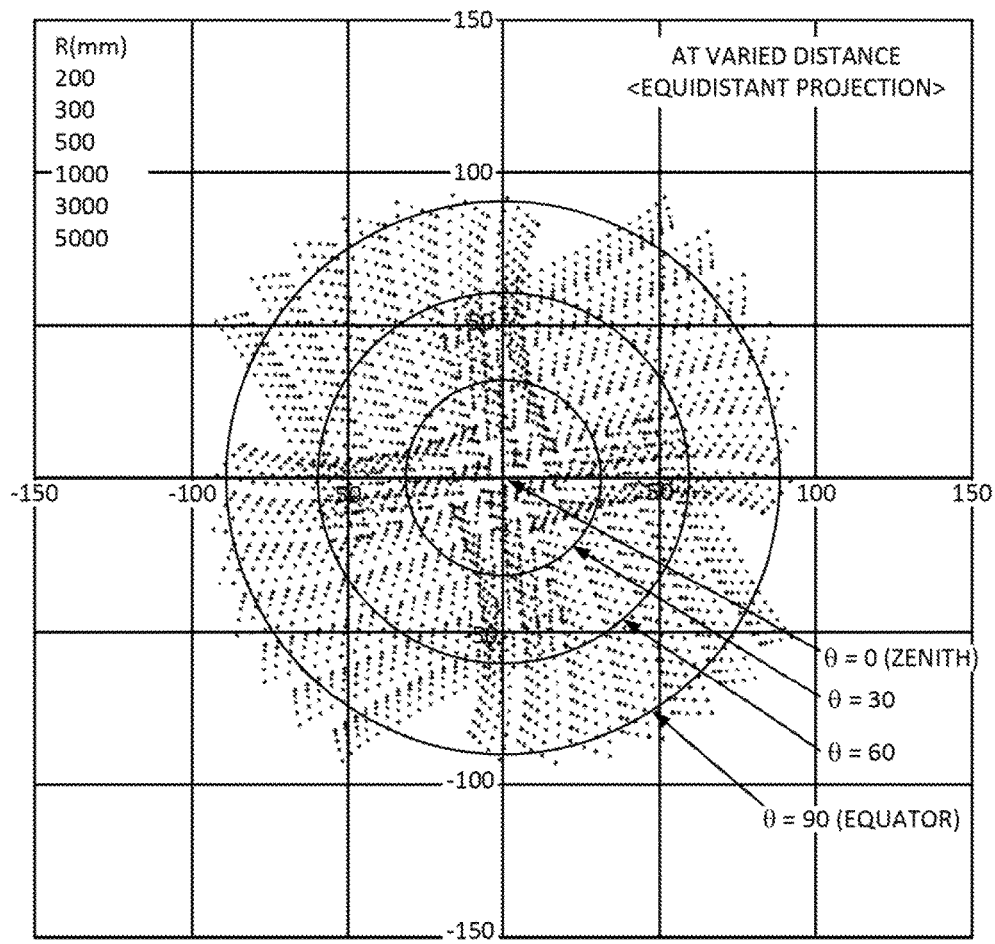
FIG. 5A illustrates a top view of the pattern that may be created by all of the light sources of FIG. 4 emitted a plurality of beams of light simultaneously.
Figure 5B:
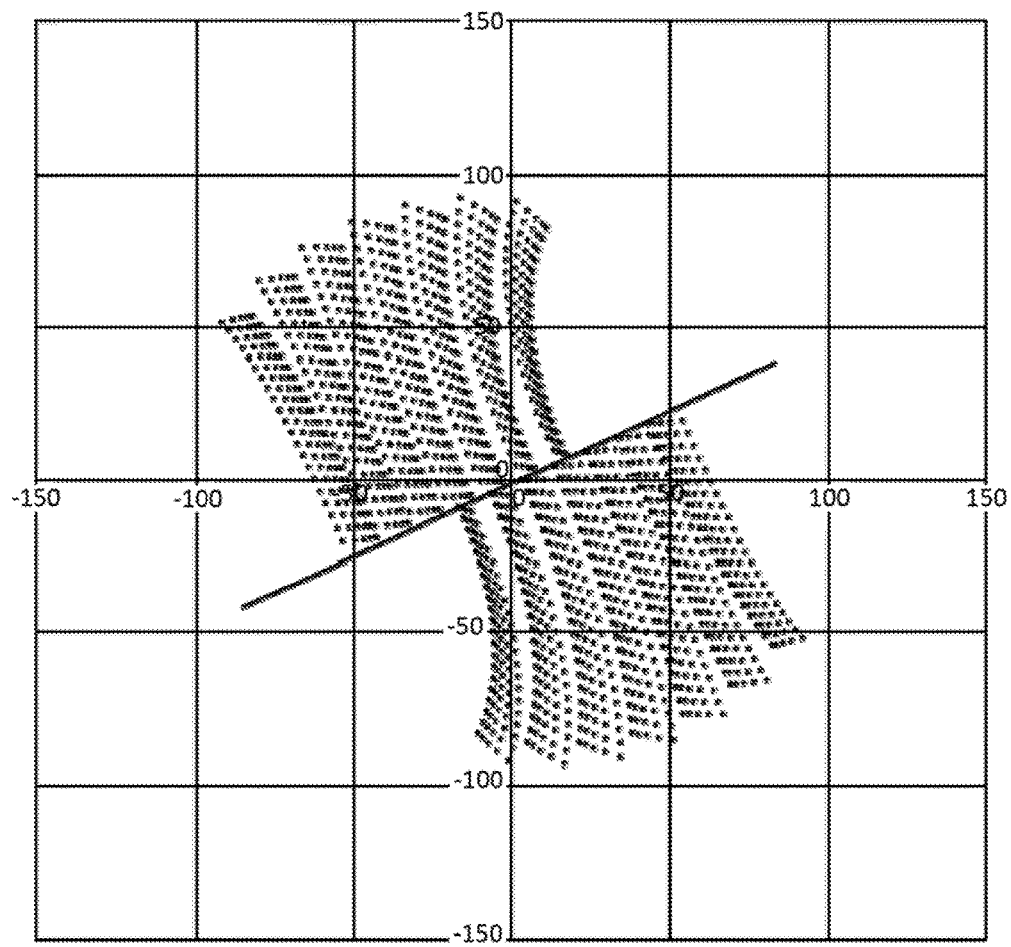
FIG. 5B illustrates a top view of half of the pattern depicted in FIG. 5A.

FIG. 5A, for instance, illustrates a top view of the pattern that may be created by all of the light sources of FIG. 4 emitted a plurality of beams of light simultaneously. In particular, the rings in FIG. 5A show the appearance of an example pattern for various spacings θ between beams projected by a common light source (e.g., for θ=0 degrees, θ=30 degrees, θ=60 degrees, and θ=90 degrees). In this case, there are four light sources, and each light source projects a fan of seven beams that creates seven parallel lines on a surface in the distance sensor's field of view. Collectively, the four light sources may project patterns that cover all or almost all of the hemispherical field of view, as shown. Thus, an approximately 180 degree field of view may be measured using a relatively small number of light sources and a single imagined sensor. As shown in FIG. 5B, which illustrates a top view of half of the pattern depicted in FIG. 5A, the respective patterns created by light sources that are spaced 180 degrees apart from each other will be offset from each other. This helps to minimize overlap of the projected patterns while ensuring that all or almost all of the hemispherical field of view is covered.

Although FIG. 5 illustrates an example in which all of the light sources of FIG. 4 emit their respective pluralities of beams of light simultaneously, in other examples, the light sources may be timed to emit their respective pluralities of beams of light in a sequence. In one example, e.g., where there are at least two pairs of light sources (i.e., at least four light sources total), a first pair of the light sources (e.g., spaced 180 degrees apart from each other as in FIG. 5B) is timed to emit their respective pluralities of beams of light at the same time. Then, the first pair of light sources ceases to project their respective pluralities of beams of light, and a second pair of light sources (e.g., also spaced 180 degrees apart from each other) emit their respective pluralities of beams of light simultaneously. Thus, two pairs of light sources alternately emit their respective pluralities of beams of light. This example involves pulse emission by the light sources, with some interval of time between each pulse emission.

Figure 6A:
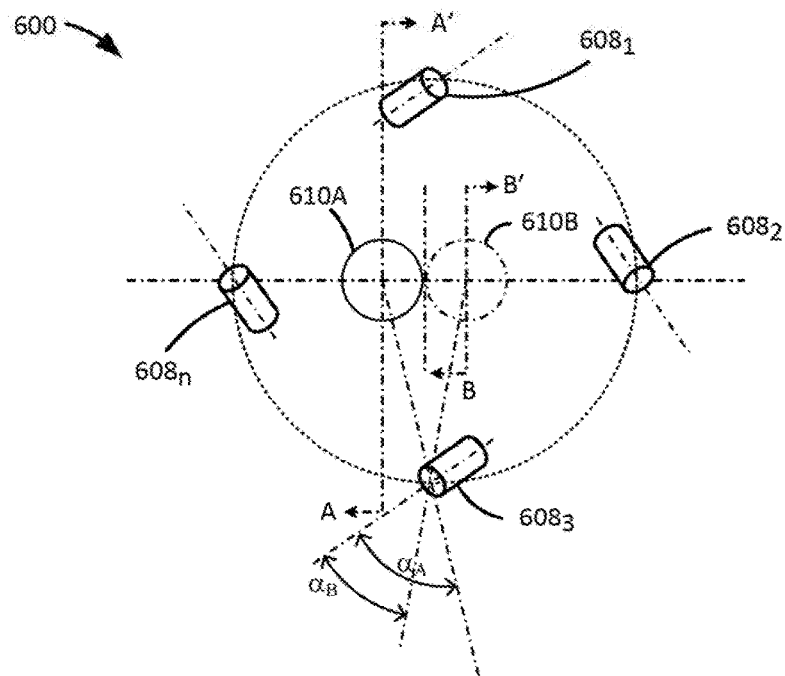
FIG. 6A illustrates a top view of an distance sensor that is similar to the distance sensor illustrated in FIG. 1B, with the exception that the distance sensor of FIG. 6A includes two imaging sensors.

In some examples, a distance sensor of the present disclosure may comprise more than one imaging sensor. FIG. 6A, for instance, illustrates a top view of a distance sensor 600 that is similar to the distance sensor 100 illustrated in FIG. 1B, with the exception that the distance sensor 600 of FIG. 6A includes two imaging sensors 610A and 610B. In one example, the different imaging sensors 610A and 610B may have different optical specifications (e.g. resolutions, light sensitivities, fields of view, etc.).

In this case, a plurality of light sources $608_1$-$608_n$ (hereinafter collectively referred to as "light sources 608" or individually referred to as a "light source 608") are arranged in a ring around the pair of imaging sensors 610A and 610B. As illustrated, the optical axes A-A' and B-B' of the imaging sensors 610A and 610B, respectively, are different, as is the positional relationship of the individual light sources 608 to each of the imaging sensors 610A and 610B (as indicated by the different angles $α_A$ and $α_B$ of the light source $608_3$).

Figure 6B:
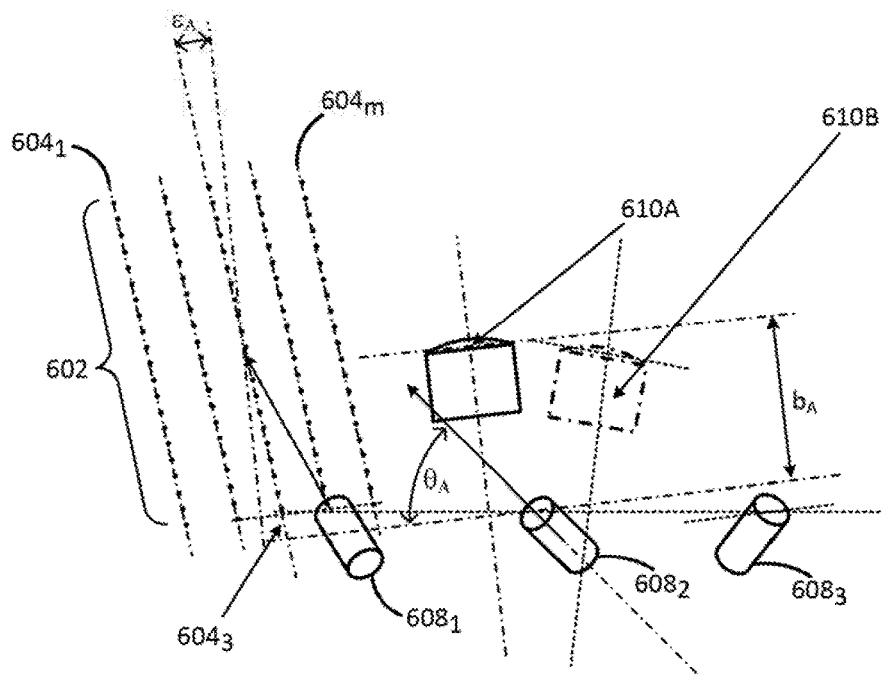
FIG. 6B illustrates a side view of the distance sensor illustrated in FIG. 6A.

As illustrated in FIG. 6B, the pattern 602 projected by the plurality of light sources 608 still comprises a plurality of parallel lines $604_1$-$604_m$ (hereinafter collectively referred to as "lines 604" or individually referred to as a "line 604"), where each line 604 further comprises a series of dots. The plurality of parallel lines 604 does not overlap or intersect. Collectively, the plurality of lines 604 may form a symmetrical pattern about a center line (i.e., line $604_3$ of FIG. 6B), where the distribution of dots is highly uniform within the field of view (with minimal blind spots, i.e., regions in which the pattern 602 is not projected). Each imaging sensor 610A and 610B captures images of the same pattern 602, but the position of the pattern 602 is specific to the respective imaging sensor's own coordinate system (e.g., based on respective optical position, axis direction, and optical main point position).

Figure 7A:
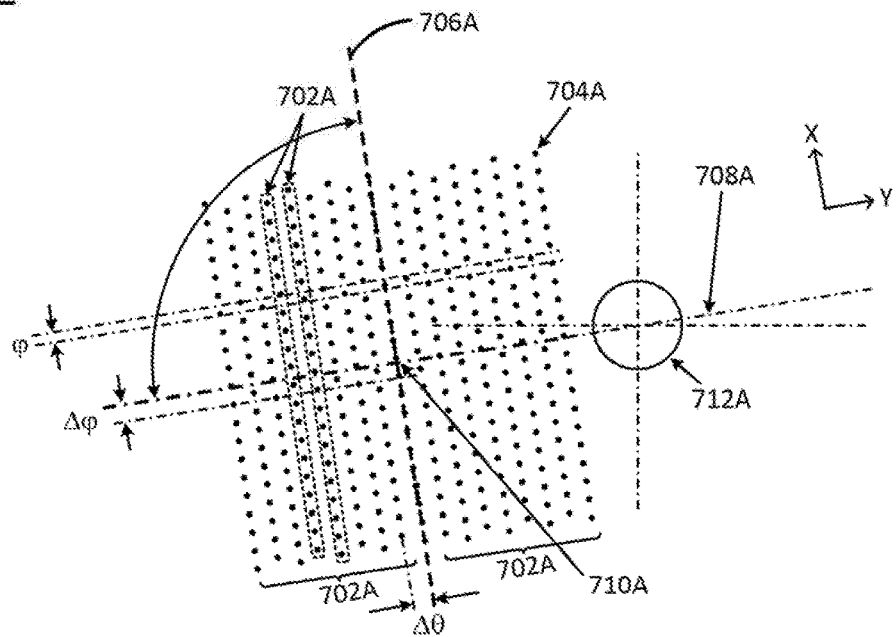
FIGS. 7A and 7B illustrate more detailed examples of projection patterns that may be projected by the distance sensor of the present disclosure.
Figure 7B:
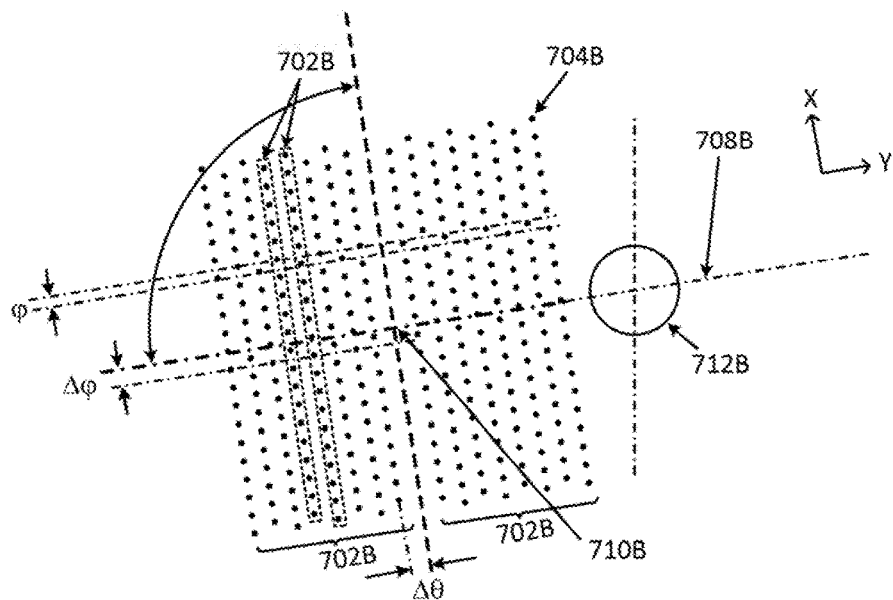

FIGS. 7A and 7B illustrate more detailed examples of projection patterns that may be projected by the distance sensor of the present disclosure. In particular, FIG. 7A illustrates a first example pattern 700A comprising a plurality of parallel lines formed of dots, including a center line of dots, while FIG. 7B illustrates a second example pattern 700B comprising a plurality of parallel lines formed of dots, without a center line of dots.

More specifically, in FIG. 7A, the pattern 700A comprises a plurality of parallel lines 702A, where each line is formed of a series of dots 704A. In one example, there is a phase difference of φ between adjacent parallel lines 702A, so that there is some displacement in the x and/or y direction between the dots 704A of the adjacent parallel lines 702A. In one example, the phase may be varied for every other line 702A (e.g., so that every other line 702A has the same phase), for every three lines 702A (e.g., so that every third line 702A has the same phase), or so on.

Collectively, the plurality of parallel lines 702A forms a rectangular matrix of dots 704A, which may be rotated by an angle Δφ and elevated by an angle Δθ. This rectangular matrix of dots is symmetrical about a first center line 706A that is orientated parallel to the x axis of the pattern 700A and is also symmetrical about a second center line 708A that is parallel to the y axis of the pattern. The rectangular matrix of dots is therefore symmetrical about the projection center 710A. The second center line 708A may also be considered the normal line for the lens 712A of an imaging sensor. In one example, at least the first center line 706A is positioned in a direction of a tangent line of a circle of the imaging sensor's optical axis. Both the first center line 706A and the second center line 708A are formed of dots 704A. The projection center 710A of the pattern 700A indicates the axis of projection of the light source from which the pattern 700A is projected. As shown, both the first center line 706A and the second center line 708A may pass through the projection center 710A of the light source.

In this example, the trajectory of the pattern 700A by varying object distance becomes parallel or almost parallel to the second center line 708A. Lines 702A of dots 704A may be positioned parallel to the second center line 708A with equal dot intervals (e.g., Δθ) or with some other regularity. These parallel lines 702A have the same configuration except for the phase shift (φ) in the dot interval.

In FIG. 7B, the pattern 700B comprises a plurality of parallel lines 702B, where each line is formed of a series of dots 704B. In one example, there is a phase difference of φ between adjacent parallel lines 702B, so that there is some displacement in the x and/or y direction between the dots 704B of the adjacent parallel lines 702B. In one example, the phase may be varied for every other line 702B (e.g., so that every other line 702B has the same phase), for every three lines 702B (e.g., so that every third line 702B has the same phase), or so on.

Collectively, the plurality of parallel lines 702B forms a rectangular matrix of dots 704B, which may be rotated by an angle $\Delta\varphi$ and elevated by an angle $\Delta\theta$. This rectangular matrix of dots is symmetrical about a first center line 706B that is orientated parallel to the x axis of the pattern 700B and is also symmetrical about a second center line 708B that is parallel to the y axis of the pattern. The rectangular matrix of dots is therefore symmetrical about the projection center 710B. The second center line 708B may also be considered the normal line for the lens 712B of an imaging sensor. In one example, at least the first center line 706B is positioned in a direction of a tangent line of a circle of the imaging sensor's optical axis. In contrast to the pattern 700A of FIG. 7A, the first center line 706B is not formed of dots 704B. Therefore, the spacing between the parallel lines 704B in FIG. 7B may be greater than the spacing between the parallel lines 702A in FIG. 7A. The projection center 710B of the pattern 700B indicates the axis of projection of the light source from which the pattern 700B is projected. As shown, both the first center line 706B and the second center line 708B may pass through the projection center 710B of the light source.

Figure 8A:
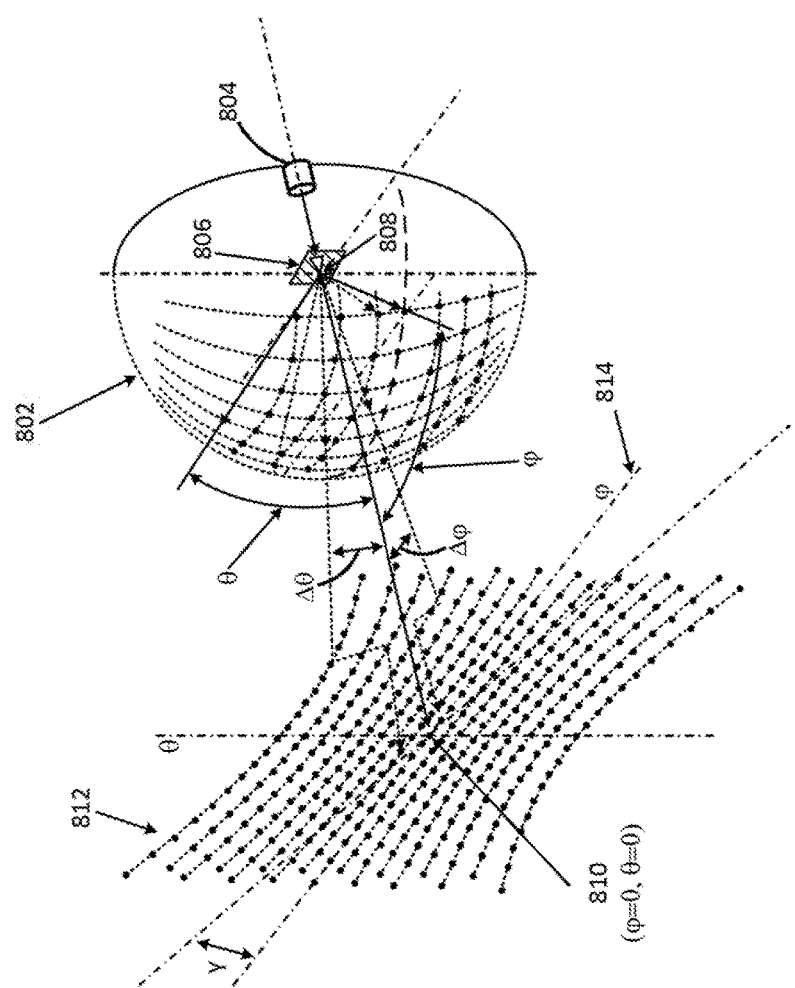
FIG. 8A illustrates an example spherical (or hemispherical) coordinate structure) that may be produced by the projection of a plurality of parallel.

FIG. 8A illustrates an example spherical (or hemispherical) coordinate structure) 800 that may be produced by the projection of a plurality of parallel lines as described above. In particular, FIG. 8A illustrates a field of view that is configured as a virtual sphere 802.

As illustrated, the distance sensor includes a light source 804 and a diffractive optical element for splitting a beam of light emitted by the light source 804 into a plurality of beams. A center 808 of the plurality of beams (e.g., a point at which the one beam is split into a plurality of beams) may be considered a projection point of the pattern, and it corresponds to a projection center 810 of the pattern 812 (where the coordinates of this projection center 810 are $(\varphi, \theta)=(0,0)$). A line extending from the projection point 808 to the projection center 810 may be considered the projection axis (direction of emission) of the light source 804.

Figure 8B:
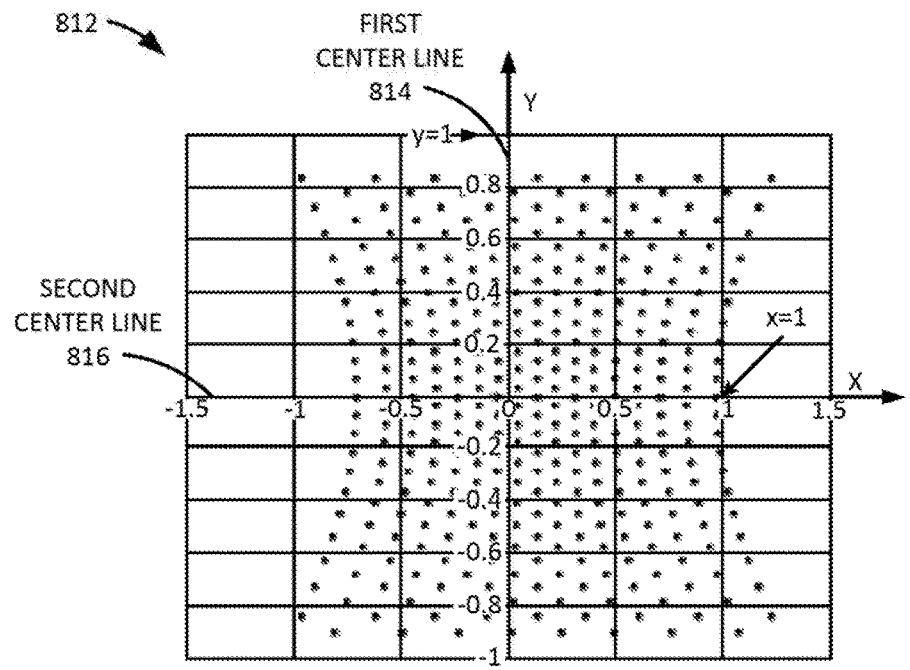
FIG. 8B illustrates the pattern of FIG. 8A at the plane projection.
Figure 8B:
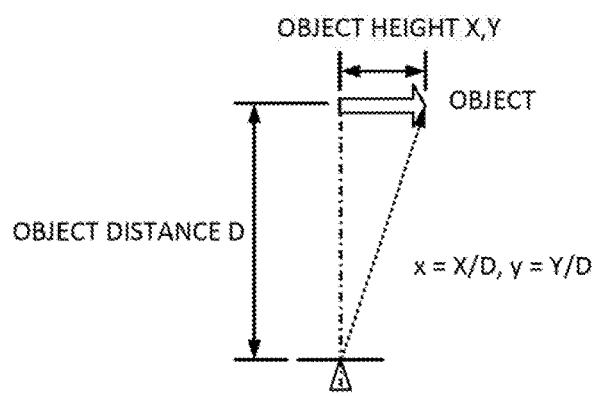

The first center line 814 of the pattern 812 corresponds to $\theta=0$ (i.e., the elevation angle $\theta$ is zero). The lines that are parallel to the first center line 814 correspond to $\theta=0p$ (i.e., the elevation angle $\theta$ is 0p, constant from parallel line to parallel line). Thus, the pattern 812 may take a pin cushion-type shape as shown in FIG. 8B, which illustrates the pattern of FIG. 8A at the plane projection. The position of each dot in the y direction may be described as $\varphi$. The second center line 816 therefore corresponds to $\varphi=0$.

Figure 8C:
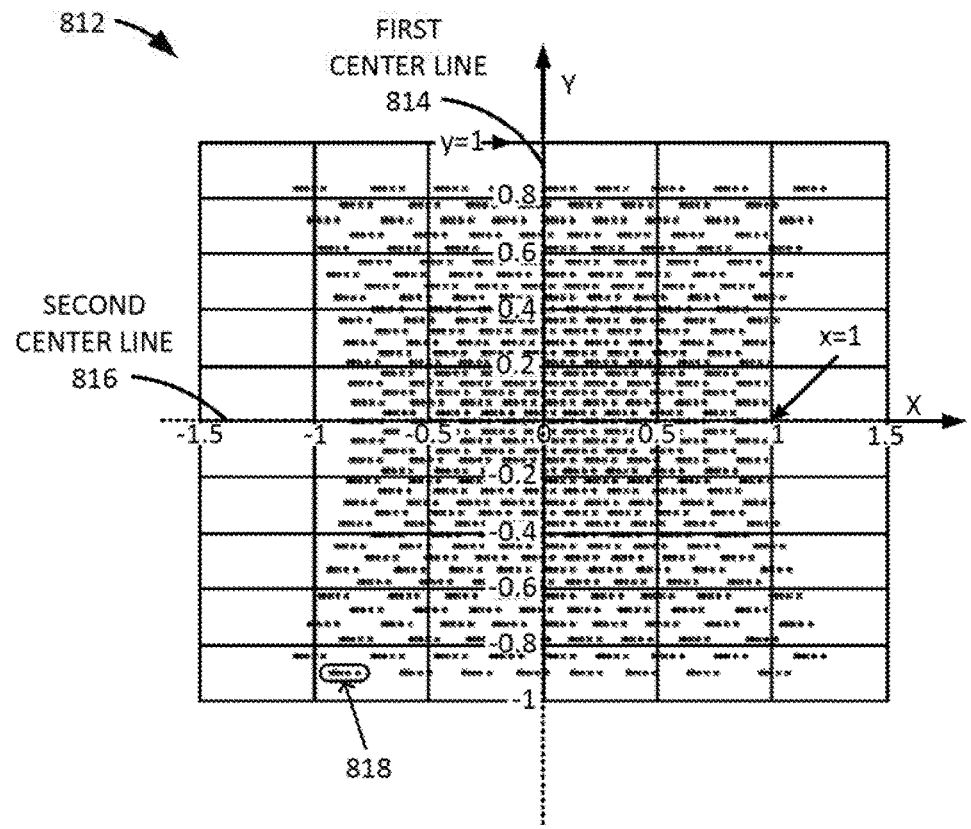
FIG. 8C which depicts the pattern of FIG. 8B in which the trajectory of the dots varies with the distance to an object.

The captured image of each dot may move in a direction parallel to the second center line 816 by varying object distance. However, when a phase shift is introduced between adjacent lines of dots, the moving areas (trajectories) of the dots should not overlap. As illustrated in FIG. 8C, which depicts the pattern 812 of FIG. 8B in which the trajectory 818 of the dots varies with the distance to an object, the phase difference between the adjacent lines of dots helps to minimize the overlap of the individual dot trajectories. This allows the dot density of the pattern 812 to be increased.

Figure 9A:
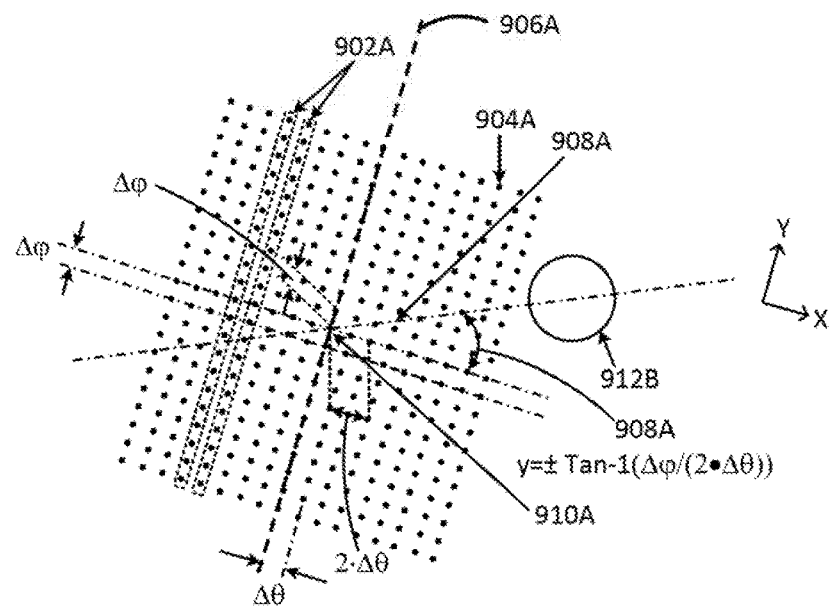
FIGS. 9A and 9B illustrate more detailed examples of projection patterns that may be projected by the distance sensor of the present disclosure.
Figure 9B:
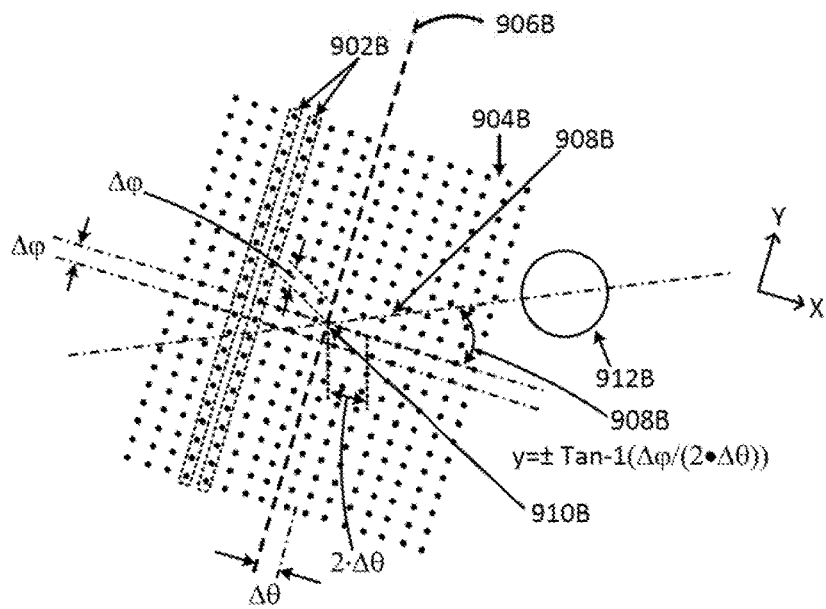

FIGS. 9A and 9B illustrate more detailed examples of projection patterns that may be projected by the distance sensor of the present disclosure. In particular, FIG. 9A illustrates a first example pattern 900A comprising a plurality of parallel lines formed of dots, including a center line of dots, while FIG. 9B illustrates a second example pattern 900B comprising a plurality of parallel lines formed of dots, without a center line of dots. The patterns 900A and 900B are similar to the patterns 700A and 700B illustrated in FIGS. 7A and 7B; however, the first center lines 906A and 906B of the patterns 900A and 900B, respectively, are tilted with an angle $\gamma$ against a tangential direction of a circle of the optical axis of the lens 912A and 912B, respectively, of the imaging sensor.

More specifically, in FIG. 9A, the pattern 900A comprises a plurality of parallel lines 902A, where each line is formed of a series of dots 904A. Collectively, the plurality of parallel lines 902A forms a rectangular matrix of dots 904A, which may be rotated by an angle $\Delta\varphi$ and elevated by an angle $\Delta\theta$. This rectangular matrix of dots is symmetrical about a first center line 906A that is orientated parallel to the x axis of the pattern 900A and is also symmetrical about a second center line 908A that is parallel to the y axis of the pattern. The rectangular matrix of dots is therefore symmetrical about the projection center 910A. The second center line 908A may also be considered the normal line for the lens 912A of an imaging sensor. In one example, at least the first center line 906A is tilted with an angle $\gamma$ against a tangential direction of a circle of the optical axis of the lens 912A.

Both the first center line 906A and the second center line 908A are formed of dots 904A. The projection center 910A of the pattern 900A indicates the axis of projection of the light source from which the pattern 900A is projected. As shown, both the first center line 906A and the second center line 908A may pass through the projection center 910A of the light source.

In this example, the trajectory of the pattern 900A by varying object distance becomes parallel or almost parallel to the second center line 908A. Lines 902A of dots 904A may be positioned parallel to the second center line 908A with equal dot intervals (e.g., $\Delta\theta$) or with some other regularity. These parallel lines 902A have the same configuration except for the phase shift ($\varphi$) in the dot interval.

In FIG. 9B, the pattern 900B comprises a plurality of parallel lines 902B, where each line is formed of a series of dots 904B. Collectively, the plurality of parallel lines 902B forms a rectangular matrix of dots 904B, which may be rotated by an angle $\Delta\varphi$ and elevated by an angle $\Delta\theta$. This rectangular matrix of dots is symmetrical about a first center line 906B that is orientated parallel to the x axis of the pattern 900B and is also symmetrical about a second center line 908B that is parallel to the y axis of the pattern. The rectangular matrix of dots is therefore symmetrical about the projection center 910B. The second center line 908B may also be considered the normal line for the lens 912B of an imaging sensor.

In one example, at least the first center line 906B is tilted with an angle $\gamma$ against a tangential direction of a circle of the optical axis of the lens 912B. In contrast to the pattern 900A of FIG. 7A, the first center line 906B is not formed of dots 904B. Therefore, the spacing between the parallel lines 904B in FIG. 9B may be greater than the spacing between the parallel lines 902A in FIG. 9A. The projection center 910B of the pattern 900B indicates the axis of projection of the light source from which the pattern 900B is projected. As shown, both the first center line 906B and the second center line 908B may pass through the projection center 910B of the light source.

Thus, the various patterns of lines disclosed herein are able to shift the area of the projection. By employing a plurality of light sources around an imaging sensor and arranging the plurality of light sources at appropriate angles and positions, it is possible to project a pattern from which the distances to objects can be detected in wide angles and high densities in three dimensions. The pattern may be tilted as described above or not tilted. In the latter case, the plurality of light sources may be arranged to concentrate on a particular area with higher density.

Figure 15:
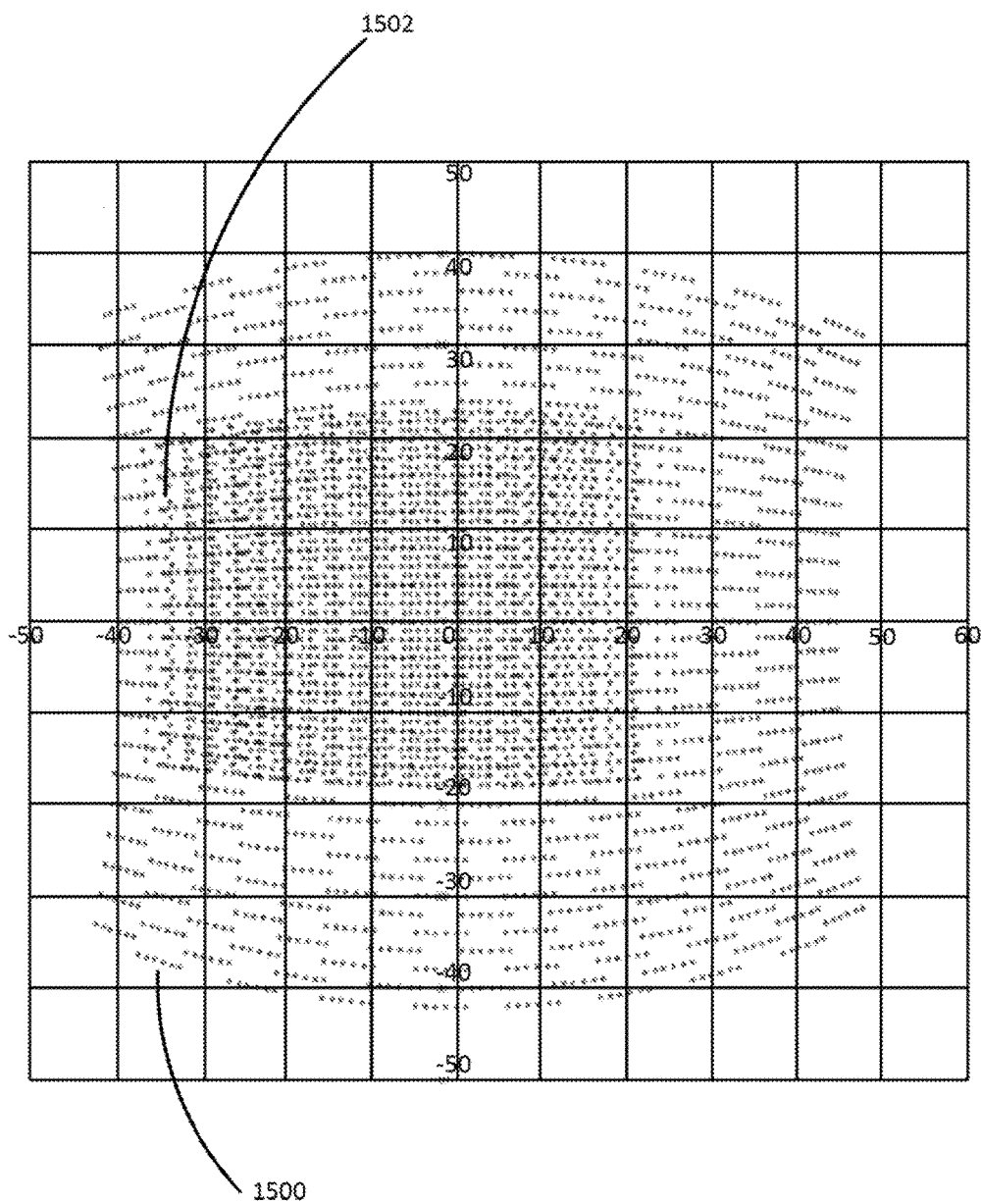
FIG. 15 depicts two different example projection patterns that are projected simultaneously.

In addition, the configurations of the light sources (and possibly the associated diffractive optical elements) may be varied, for instance by varying projection area, dot pattern, light intensity, dot spot focusing, or the like, or by combining wide area and narrow area with high-intensity projections. The configurations of the imaging sensor can also be varied by using multiple imaging sensors, or by varying focus length, focusing position, or the like. FIG. 15, for example, depicts two different example projection patterns that are projected simultaneously. A first projection pattern 1500 may be projected from a first light source, while a second projection pattern 1502 may be projected from a second light source. As illustrated, the spacing between the lines of the second projection pattern 1502 is smaller than the spacing between the lines of the first projection pattern 1500. In addition, the spacing between the dots of the second projection pattern 1502 is smaller than the spacing between the dots of the first projection pattern 1500. As a result, the overall projection area of the second projection pattern 1502 is smaller than the overall projection area of the first projection pattern 1500. Such flexibility in terms of pattern creation may allow the distance sensor to more effectively measure distance in the presence of imaging sensor variations (e.g., focus length adjustments, focusing position adjustments, and the like).

Figure 10A:
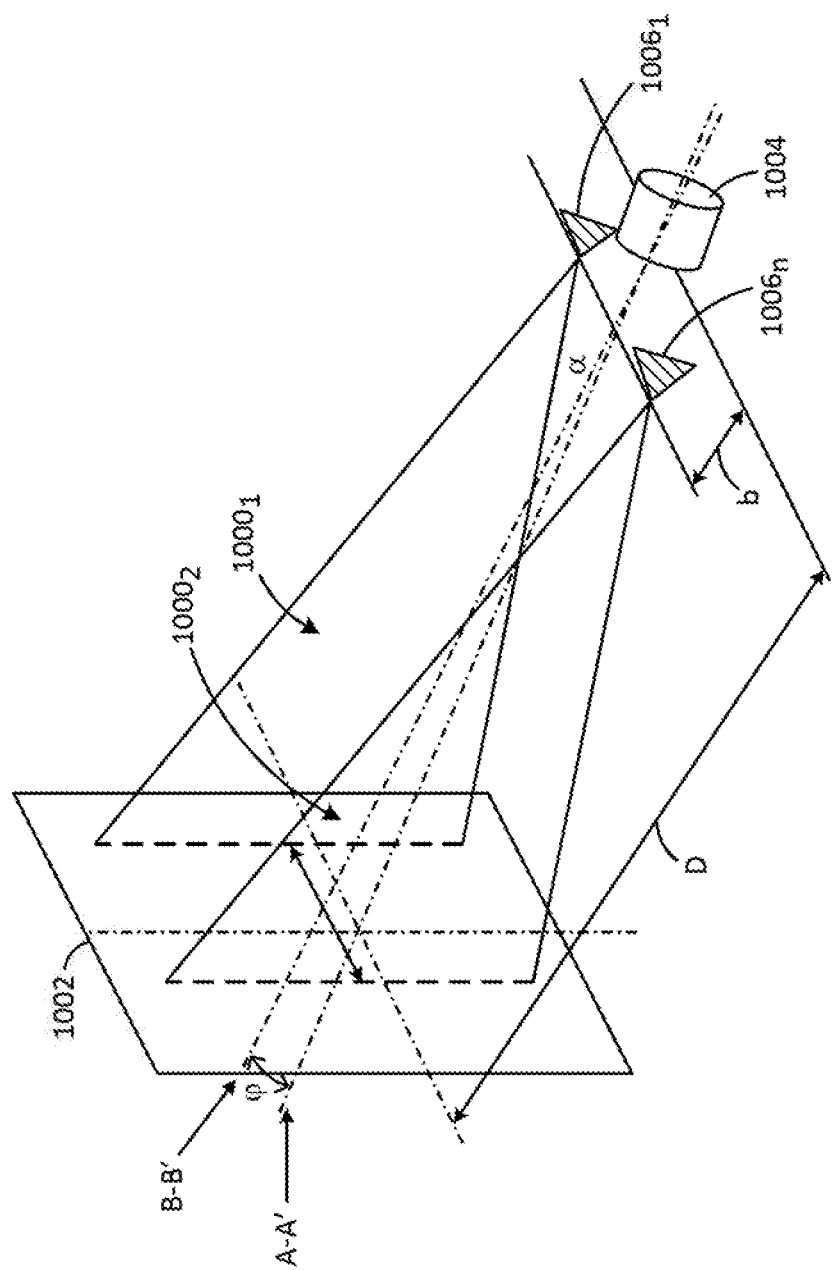
FIG. 10A is an illustration showing relevant parameters for calculating the distance to an object using a pair of parallel lines, where each of the lines comprises a series of dots.

FIG. 10A is an illustration showing relevant parameters for calculating the distance to an object using a pair of parallel lines $1000_1$ and $1000_2$ (hereinafter collectively referred to as "lines 1000" or individually referred to as a "line 1000"), where each of the lines 1000 comprises a series of dots. It should be noted that FIG. 10A illustrates a simplified example; in practice, more than two parallel lines (e.g., seven parallel lines in one example) may be projected. As illustrated, the parallel lines 1000 are projected onto an object 1002 that is positioned a distance, D, from an imaging sensor 1004 of a distance sensor. The parallel lines 1000 are spaced apart by a projection interval α, where the midpoint of the interval (or projection center) is defined by an axis B-B'. A distance of φ exists between the axis B-B' and the central axis A-A' of the distance sensor 1004. The light sources $1006_1$-$1700_2$ (hereinafter collectively referred to as "light sources 1006" or individually referred to as a "light source 1006") are set a distance b in front of the imaging sensor 1004.

Figure 10B:
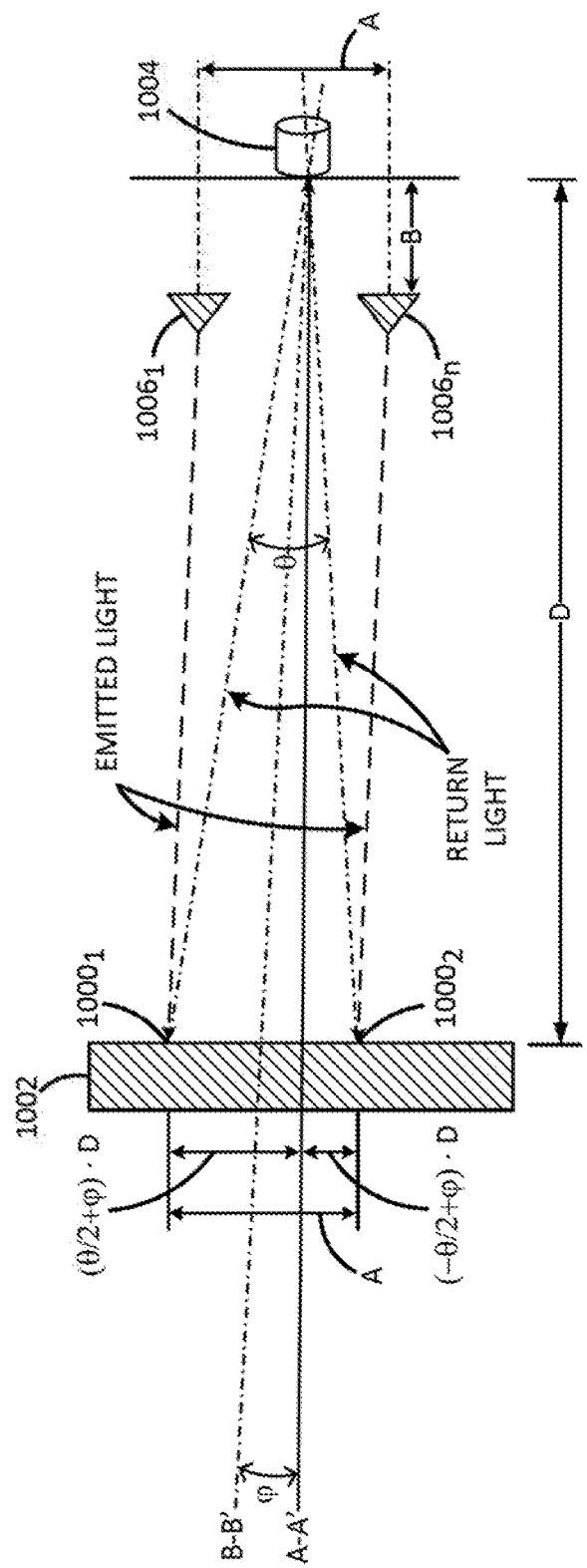
FIG. 10B illustrates one example of an algorithm for calculating the distance D from the imaging sensor of FIG. 10A to the object of FIG. 10A.

FIG. 10B illustrates one example of an algorithm for calculating the distance D from the imaging sensor 1004 of FIG. 10A to the object 1002 of FIG. 10A. In addition to the parameters illustrated in FIG. 10A, FIG. 10B illustrates that a portion of the light emitted by the light sources 1006 (i.e., the parallel lines of dots, which are separated by the projection interval α) is reflected by the object 1002 and returns to the imaging sensor 1004 as return light. The beams of the return light are separated by a distance of θ, which is given by an image captured by the imaging sensor 1004.

When the distance φ between the axis B-B' and the central axis A-A' of the distance sensor 1004 is known to be zero, $(\alpha/2)/D = \tan(\theta/2)$. Thus, the distance D from the imaging sensor 1004 to the object 1002 may be calculated as $D=(\alpha/2)/\tan(\theta/2)$. Also, $D \approx \alpha/\tan(\theta)$ when $\alpha \ll D$.

When the distance φ between the axis B-B' and the central axis A-A' of the distance sensor 1004 is known to be a non-zero number, $D \approx \alpha/\tan(\theta)$ when $\theta=(\theta/2+\varphi)-(-\theta/2+\varphi)$.

Figure 11A:
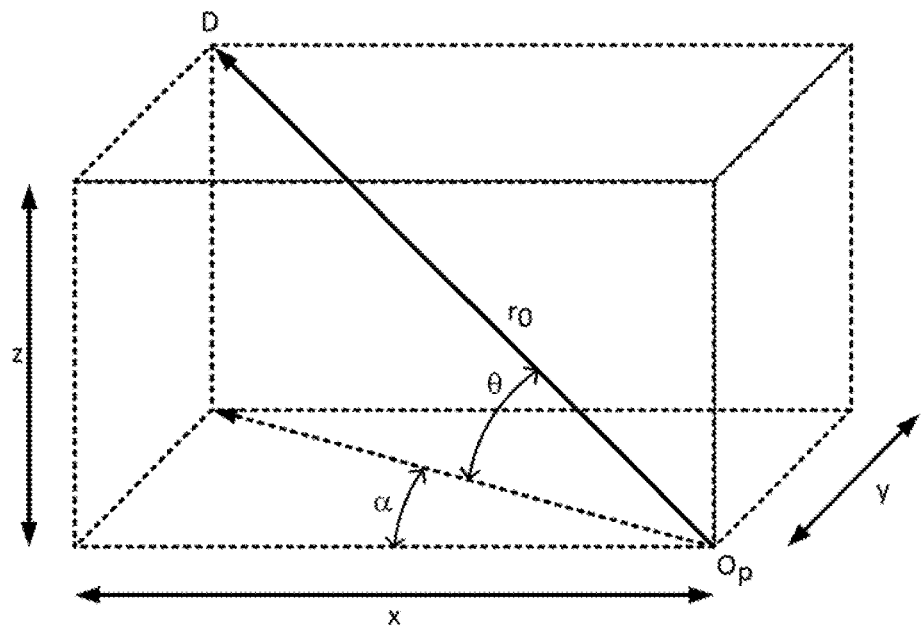
FIGS. 11A and 11B illustrate the concepts from which a simple algorithm for calculating the distance to an object using the distance sensor disclosed herein can be derived.
Figure 11B:
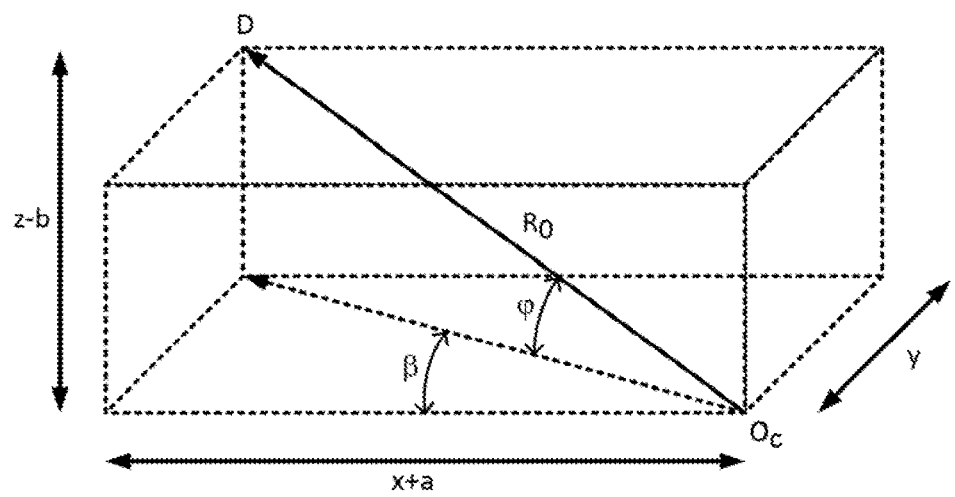

FIGS. 11A and 11B illustrate the concepts from which a simple algorithm for calculating the distance to an object using the distance sensor disclosed herein can be derived. Referring to FIG. 11A, the height z, depth y, and length x of the vector $r_0$ from $O_p$ to D can be computed as follows:

$$z = r_0 \sin \theta \quad \text{(EQN. 1)}$$

$$y = r_0 \cos \theta \sin \alpha \quad \text{(EQN. 2)}$$

$$x = r_0 \cos \theta \cos \alpha \quad \text{(EQN. 3)}$$

Thus, $$r_0^2 = x^2 + y^2 + z^2 \quad \text{(EQN. 4)}$$

EQNs. 1-4 describe the positional relationships of a plurality of parameters of a tilted projection beam emitted by a distance sensor.

Referring to FIG. 11B, when the height is decreased by b and the length is increased by a, the dimensions can be computed as:

$$z - b = R_0 \sin \varphi \quad \text{(EQN. 5)}$$

$$y = R_0 \cos \varphi \sin \beta \quad \text{(EQN. 6)}$$

$$x + a = R_0 \cos \varphi \cos \beta \quad \text{(EQN. 7)}$$

Thus, $$R_0^2 = (x+a)^2 + y^2 + (z-b)^2 \quad \text{(EQN. 8)}$$

From EQN. 1 and EQN 5, one can derive:

$$R0 \sin \varphi + b = r0 \sin \theta \quad \text{(EQN. 9)}$$

From EQN. 2 and EQN 6, one can derive:

$$R_0 \cos \varphi \sin \beta = r_0 \cos \theta \sin \alpha \quad \text{(EQN. 10)}$$

From EQN. 3 and EQN 7, one can derive:

$$R_0 \cos \varphi \cos \beta - a = r_0 \cos \theta \cos \alpha \quad \text{(EQN. 11)}$$

Thus, $$R_0 = \frac{a \sin \beta + b \cos \theta \cos \alpha}{\cos \varphi \cos \beta \sin \theta - \sin \varphi \cos \theta \cos \alpha} \quad \text{(EQN. 12)}$$

β and φ are measured from an image captured by the imaging sensor; a, b, and α are known from the imaging sensor/projection settings; and θ is known from the projection pattern.

Figure 12:
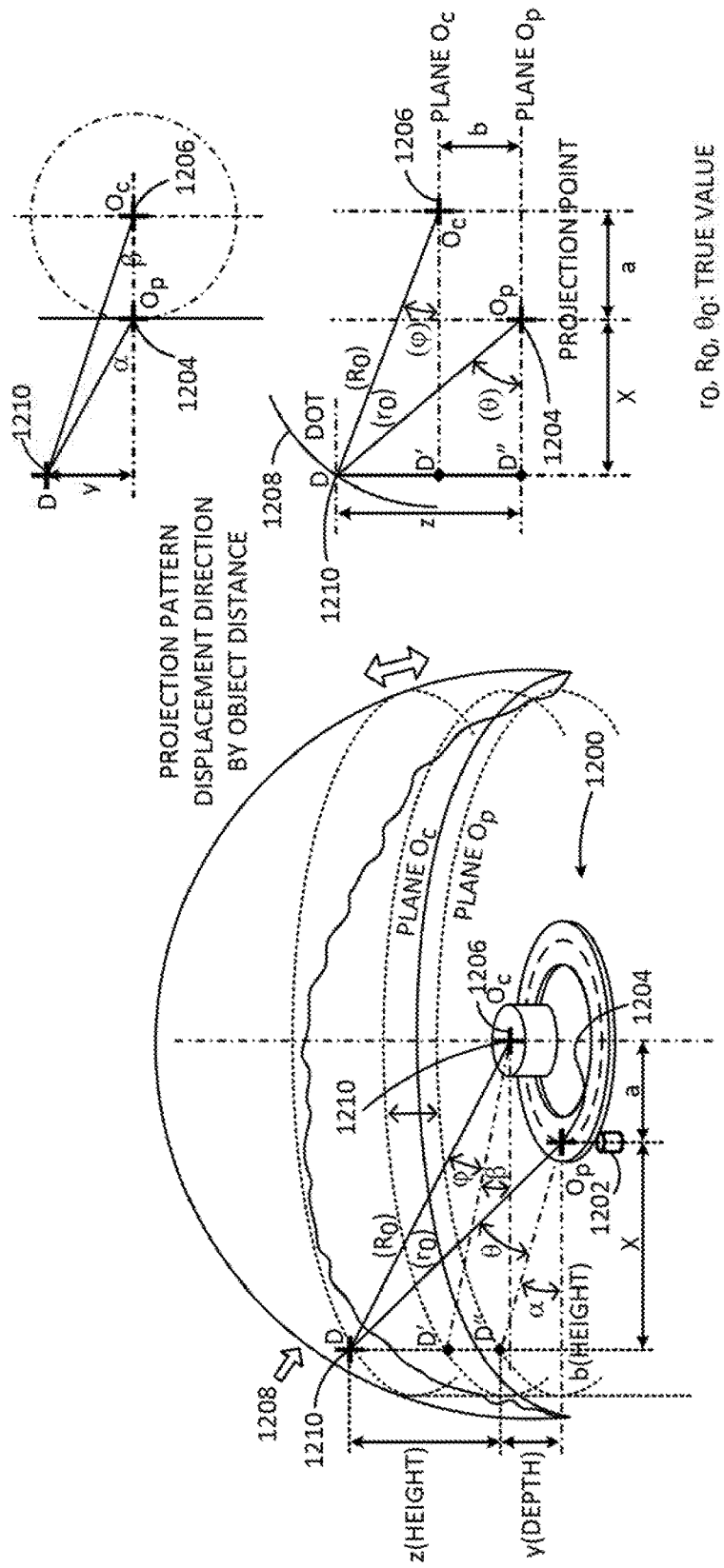
FIG. 12 illustrates the concepts of FIGS. 11A-11B extended to an example distance sensor.

FIG. 12 illustrates the concepts of FIGS. 11A-11B extended to an example distance sensor 1200. The example distance sensor 1200 includes a ring-shaped array of light sources including light source 1202, a projection point, such as projection point 1204, corresponding to each light source (and possibly including a diffractive optical element or other beam splitting means), and an imaging sensor 1206 (including a wide-angle lens). The example distance sensor 1200 is configured to project a plurality of parallel lines of dots which collectively forms a virtual sphere 1208.

As illustrated, a projection point of the distance sensor 1200, such as projection point 1206, projects a plurality of beams that forms a plurality of parallel lines of dots on an object 1210 positioned a distance D away from the imaging sensor 1206. An angle of a center of the beams relative to an axis B-B' extending radially outward from the central axis is defined by α. A portion of the light emitted by the projection point is reflected back to the imaging sensor 1206 as a beam of return light.

Figure 13:
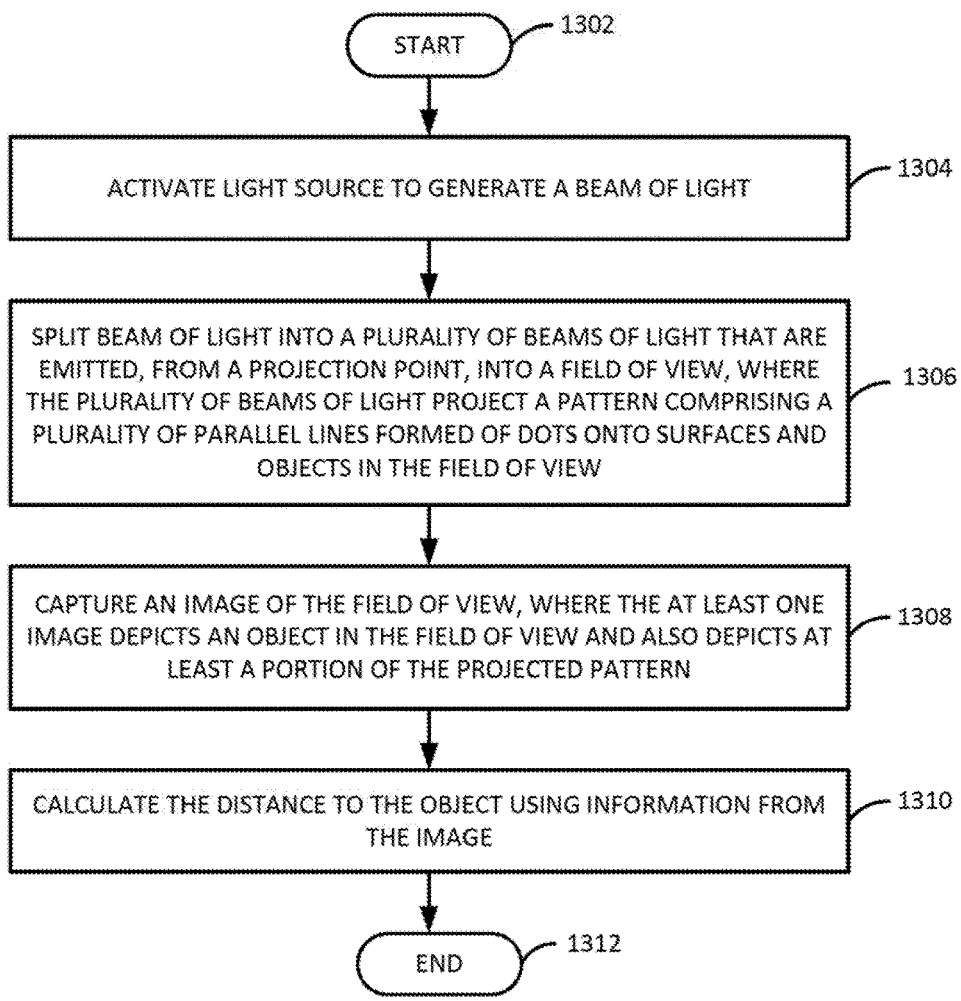
FIG. 13 illustrates a flowchart of a method for calculating the distance from a sensor to an object or point in space.
Figure 14:
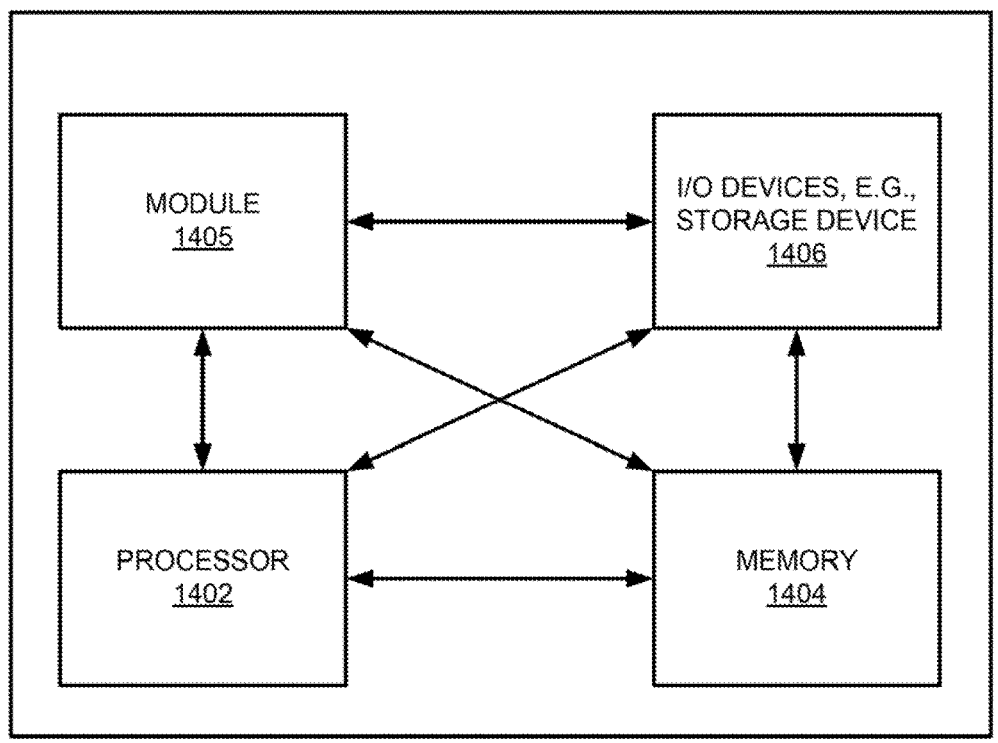
FIG. 14 depicts a high-level block diagram of a general-purpose computer suitable for use in performing the functions described herein.

FIG. 13 illustrates a flowchart of a method 1300 for calculating the distance from a sensor to an object or point in space. In one embodiment, the method 1300 may be performed by a processor integrated in an imaging sensor (such as the imaging sensor 110 illustrated in FIGS. 1A-1B) or a general purpose computing device as illustrated in FIG. 14 and discussed below.

The method 1300 begins in step 1302. In step 1304, a light source is activated to generate a beam of light. In one example, the light source is one of a plurality of light sources to be activated simultaneously. In one example, the light source comprise a laser light source.

In step 1306, the beam of light is split into a plurality of beams of light, e.g., using a diffractive optical element or other beam splitting means that is positioned in the path along which the beam generated in step 1304 propagates. The resultant plurality of beams of light is emitted into a field of view from a projection point and projects a pattern onto surfaces and objects in the field of view. In one example, the pattern comprises a plurality of parallel lines, where each of the lines is formed of a series of dots. When the plurality of parallel lines is arranged symmetrically around a central point, the pattern may thus look like a rectangular matrix of dots.

In step 1308, an image of the field of view is captured. The image depicts an object in the field of view, as well as at least a portion of the pattern that is projected into the field of view in step 1306.

In step 1310, the distance from the sensor to the object is calculated using information from the images captured in step 1308. In one example, a triangulation technique is used to calculate the distance. For example, the positional relationships between parts of the patterns (e.g., individual dots) projected by the light source(s) can be used as the basis for the calculation.

The method 1300 ends in step 1312. Thus, the method 1300, in combination with the sensor depicted in FIGS. 1A-1B or with a sensor having similar capabilities, can measure the distance from the sensor to an object or point in space in a single cycle of image capture and calculation.

FIG. 14 depicts a high-level block diagram of a general-purpose computer suitable for use in performing the functions described herein. As depicted in FIG. 14, the system 1400 comprises one or more hardware processor elements 1402 (e.g., a central processing unit (CPU), a microprocessor, or a multi-core processor), a memory 1404, e.g., random access memory (RAM) and/or read only memory (ROM), a module 1405 for calculating distance, and various input/output devices 1406 (e.g., storage devices, including but not limited to, a tape drive, a floppy drive, a hard disk drive or a compact disk drive, a receiver, a transmitter, a lens and optics, an output port, an input port and a user input device (such as a keyboard, a keypad, a mouse, a microphone and the like)). Although only one processor element is shown, it should be noted that the general-purpose computer may employ a plurality of processor elements. Furthermore, although only one general-purpose computer is shown in the figure, if the method(s) as discussed above is implemented in a distributed or parallel manner for a particular illustrative example, i.e., the steps of the above method(s) or the entire method(s) are implemented across multiple or parallel general-purpose computers, then the general-purpose computer of this figure is intended to represent each of those multiple general-purpose computers. Furthermore, one or more hardware processors can be utilized in supporting a virtualized or shared computing environment. The virtualized computing environment may support one or more virtual machines representing computers, servers, or other computing devices. In such virtualized virtual machines, hardware components such as hardware processors and computer-readable storage devices may be virtualized or logically represented.

It should be noted that the present disclosure can be implemented in software and/or in a combination of software and hardware, e.g., using application specific integrated circuits (ASIC), a programmable logic array (PLA), including a field-programmable gate array (FPGA), or a state machine deployed on a hardware device, a general purpose computer or any other hardware equivalents, e.g., computer readable instructions pertaining to the method(s) discussed above can be used to configure a hardware processor to perform the steps, functions and/or operations of the above disclosed methods. In one embodiment, instructions and data for the present module or process 1405 for calculating distance (e.g., a software program comprising computer-executable instructions) can be loaded into memory 1404 and executed by hardware processor element 1402 to implement the steps, functions or operations as discussed above in connection with the example method 1300. Furthermore, when a hardware processor executes instructions to perform "operations", this could include the hardware processor performing the operations directly and/or facilitating, directing, or cooperating with another hardware device or component (e.g., a co-processor and the like) to perform the operations.

The processor executing the computer readable or software instructions relating to the above described method(s) can be perceived as a programmed processor or a specialized processor. As such, the present module 1405 for calculating distance (including associated data structures) of the present disclosure can be stored on a tangible or physical (broadly non-transitory) computer-readable storage device or medium, e.g., volatile memory, non-volatile memory, ROM memory, RAM memory, magnetic or optical drive, device or diskette and the like. More specifically, the computer-readable storage device may comprise any physical devices that provide the ability to store information such as data and/or instructions to be accessed by a processor or a computing device such as a computer or an application server.

While various embodiments have been described above, it should be understood that they have been presented by way of example only, and not limitation. Thus, the breadth and scope of a preferred embodiment should not be limited by any of the above-described exemplary embodiments, but should be defined only in accordance with the following claims and their equivalents.

What is claimed is:

1. A method for calculating a distance from a distance sensor to an object, the method comprising:
projecting a plurality of beams simultaneously from a light source of the distance sensor, wherein the plurality of beams causes a plurality of lines of dots to be projected onto the object, wherein the plurality of lines of dots are orientated parallel to each other, wherein an appearance of each line of dots of the plurality of lines of dots on the object is inclined by an angle ε of between minus forty-five and plus forty-five degrees relative to a line that is normal to a plane of the light source, wherein the angle ε counters a winding direction against an angle α that is greater than zero degrees, and wherein the light source is one of a plurality of light sources, and each light source of the plurality of light sources projects a respective plurality of beams that causes a respective plurality of lines of dots to be projected into the field of view;

capturing an image of a field of view using an imaging sensor of the distance sensor, wherein the object is visible in the image and the plurality of lines of dots is also visible in the image, and wherein the plurality of light sources is positioned behind a principal point of the imaging sensor, relative to a direction in which the plurality of beams propagates; and calculating the distance to the object using information in the image.

2. The method of claim 1, wherein the plurality of lines of dots forms a pattern that is symmetrical about a center line of the plurality of lines of dots.

3. The method of claim 1, wherein the plurality of light sources comprises an even number of light sources.

4. The method of claim 3, wherein the even number is four.

5. The method of claim 1, wherein the plurality of light sources project their respective plurality of beams in a sequence.

6. The method of claim 5, wherein the sequence comprises:
a first projection of a respective plurality of beams by a first pair of the plurality of light sources; and
a second projection of a respective plurality of beams by a second pair of the plurality of light sources, subsequent to the first projection.

7. The method of claim 1, wherein each light source of the plurality of light sources projects its respective plurality of beams in a direction of the object with a common angle relative to an optical axis of the imaging sensor.

8. The method of claim 1, wherein each light source of the plurality of light sources is positioned a common distance from the imaging sensor, wherein the common distance is measured along an optical axis of the imaging sensor.

9. The method of claim 1, wherein each light source of the plurality of light sources projects is positioned to create angle $\alpha$ between a direction of projection of a respective plurality of beams and a line that is normal to an optical axis of the imaging sensor.

10. The method of claim 9, wherein the angle $\alpha$ is the same for each light source of the plurality of light sources.

11. The method of claim 9, wherein the angle $\alpha$ is different for at least two light sources of the plurality of light sources.

12. The method of claim 9, wherein the angle $\alpha$ is at least thirty degrees.

13. The method of claim 1, wherein at least two light sources of the plurality of light sources emit light of different intensities.

14. The method of claim 1, wherein a first light source of the plurality of light sources projects a first plurality of beams, a second light source of the plurality of light sources projects a second plurality of beams, and a first pattern produced by the first plurality of beams when incident on the object is different from a second pattern produced by the second plurality of beams when incident on the object.

15. The method of claim 1, wherein the imaging sensor includes a wide angle lens.

16. The method of claim 1, wherein the image of the field of view is one of a plurality of images of the field of view, and each image in the plurality of images is captured by a different imaging sensor having a different positional relationship relative to the light source.

17. The method of claim 16, wherein each different imaging sensor has different optical specifications.

18. The method of claim 1, wherein the angle $\varepsilon$ is defined from a view from a point from which the plurality of beams is projected to the object, and the angle $\alpha$ is defined from a view from the object.

19. The method of claim 1, wherein the winding of the angle $\alpha$ is clockwise, and a winding direction of angle $\varepsilon$ is counter clockwise.

20. A computer-readable storage device storing a plurality of instructions which, when executed by a processor, cause the processor to perform operations for calculating a distance from a distance sensor to an object, the operations comprising:
projecting a plurality of beams simultaneously from a light source of the distance sensor, wherein the plurality of beams causes a plurality of lines of dots to be projected onto the object, wherein the plurality of lines of dots are orientated parallel to each other, wherein an appearance of each line of dots of the plurality of lines of dots on the object is inclined by an angle $\varepsilon$ of between minus forty-five and plus forty-five degrees relative to a line that is normal to a plane of the light source, wherein the angle $\varepsilon$ counters a winding direction against an angle $\alpha$ that is greater than zero degrees, and wherein the light source is one of a plurality of light sources, and each light source of the plurality of light sources projects a respective plurality of beams that causes a respective plurality of lines of dots to be projected into the field of view;

capturing an image of a field of view using an imaging sensor of the distance sensor, wherein the object is visible in the image and the plurality of lines of dots is also visible in the image, and wherein the plurality of light sources is positioned behind a principal point of the imaging sensor, relative to a direction in which the plurality of beams propagates; and calculating the distance to the object using information in the image.

21. A distance sensor for calculating a distance to an object, comprising:
a light source of the distance sensor to project a plurality of beams simultaneously, wherein the plurality of beams causes a plurality of lines of dots to be projected onto an object, wherein the plurality of lines of dots are orientated parallel to each other, wherein an appearance of each line of dots of the plurality of lines of dots on the object is inclined by an angle of between minus forty-five and plus forty-five degrees relative to a line that is normal to a plane of the light source, wherein the angle $\varepsilon$ counters a winding direction against an angle $\alpha$ that is greater than zero degrees, and wherein the light source is one of a plurality of light sources, and each light source of the plurality of light sources projects a respective plurality of beams that causes a respective plurality of lines of dots to be projected into the field of view;

an imaging sensor of the distance sensor to capture an image of a field of view, wherein the object is visible in the image and the plurality of lines of dots is also visible in the image, and wherein the plurality of light sources is positioned behind a principal point of the imaging sensor, relative to a direction in which the plurality of beams propagates; and circuitry to calculate the distance to the object using information in the image.

* * * * *